United States Patent
Damnjanovic et al.

(10) Patent No.: US 11,991,740 B2
(45) Date of Patent: May 21, 2024

(54) RADIO UNIT SHARING TECHNIQUES IN WIRELESS COMMUNICATIONS

(71) Applicant: QUALCOMM Incorporated, San Diego, CA (US)

(72) Inventors: Aleksandar Damnjanovic, Del Mar, CA (US); Douglas Knisely, Redmond, WA (US); Rajat Prakash, San Diego, CA (US); Abhishek Saurabh Sachidanand Sinha, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/443,768

(22) Filed: Jul. 27, 2021

(65) Prior Publication Data

US 2023/0036652 A1   Feb. 2, 2023

(51) Int. Cl.
*H04W 72/044* (2023.01)
*H04L 5/14* (2006.01)
*H04W 72/56* (2023.01)

(52) U.S. Cl.
CPC ........... *H04W 72/56* (2023.01); *H04L 5/14* (2013.01); *H04W 72/044* (2013.01)

(58) Field of Classification Search
CPC .............................................. H04W 72/0446
See application file for complete search history.

(56) References Cited

U.S. PATENT DOCUMENTS

| 2016/0014799 | A1* | 1/2016 | Aydin | H04W 72/1226 |
| | | | | 370/329 |
| 2017/0332438 | A1* | 11/2017 | Olsson | H04W 28/12 |
| 2018/0115979 | A1* | 4/2018 | Montojo | H04W 72/0446 |
| 2019/0045397 | A1* | 2/2019 | Mueck | H04W 88/06 |

(Continued)

FOREIGN PATENT DOCUMENTS

| CN | 104811228 A | * | 7/2015 | | H04B 7/02 |
| EP | 2151954 A1 | * | 2/2010 | ......... | H04L 12/5695 |

(Continued)

OTHER PUBLICATIONS

Machine Translation of Fu, CN-104811228 (Foreign Patent Document N above) (Year: 2015).*

*Primary Examiner* — Benjamin Lamont
(74) *Attorney, Agent, or Firm* — Holland & Hart LLP

(57) ABSTRACT

Methods, systems, and devices for wireless communications are described in which multiple operators may perform spectrum sharing using shared radio units (RUs), where the multiple different operators can access a same RU for communications with a user equipment (UE). A shared RU may receive requests for resources from two or more network nodes of two or more different network operators, for wireless resources in a first time period. The RU may determine a first resource allocation for the first time period based on different priorities of the different network operators. A first network operator may have a higher priority than a second or third network operator, and resources may be allocated to the first network operator ahead of the second or third network operators. The RU may transmit the first resource allocation to each of the different network nodes that transmitted requests for resources.

15 Claims, 24 Drawing Sheets

(56) References Cited

U.S. PATENT DOCUMENTS

2019/0110208 A1* 4/2019 Xue ................. H04W 48/02
2019/0327649 A1* 10/2019 Liu .................. H04W 36/0072
2020/0015268 A1* 1/2020 Zhang .............. H04W 74/0808
2020/0084766 A1* 3/2020 Pawlak ............. H04B 7/2656
2020/0382993 A1* 12/2020 Zhao ................ H04W 80/02

FOREIGN PATENT DOCUMENTS

WO     WO-2017172100 A1 * 10/2017
WO     WO-2021254695 A1 * 12/2021 ........... H04W 16/14

* cited by examiner

RADIO UNIT SHARING TECHNIQUES IN WIRELESS COMMUNICATIONS

FIELD OF TECHNOLOGY

The following relates to wireless communications, including radio unit sharing techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, multiple network operators may operate different networks in a same geographic area, using separate resources. For example, a first network operator may operate in a first area using a first set of frequencies, and a second network operator may operate in the first area using a second set of frequencies, such that both network operators may concurrently provide communications between base stations and UEs associated with the respective network. In some cases, one network may experience congestion, while the other network may have available resources, and thus the total radio frequency spectrum may be used less efficiently than a regulator or radio spectrum manager may desire.

SUMMARY

The described techniques relate to improved methods, systems, devices, and apparatuses that support radio unit (RU) sharing techniques in wireless communications. In various aspects, described techniques provide for multiple operators to perform spectrum sharing using shared RUs, where the multiple different operators can access a same RU for transmission and reception of over the air signals to and from a user equipment (UE) or multiple UEs. In some cases, a shared RU may receive requests for resources from two or more network nodes of two or more different networks (e.g., two or more mobile network operators (MNOs)), for wireless resources in a first time period. The RU may determine a first resource allocation for the first time period based on different priorities of the different networks. In some cases, a first network may have a higher priority than a second network or third network, and resources may be allocated to the first network ahead of the second network or third network. The RU may transmit the first resource allocation to each of the different network nodes that transmitted requests for resources.

In some cases, interference management between RUs may be managed through interference inquiries to determine whether a particular resource configuration (e.g., a time division duplexing (TDD) configuration) of one RU is likely to cause interference at another RU. Based on responses to the interference inquiries, one or more resource configurations may be updated. In some cases, a network node, such as a central unit and/or distributed unit, may transmit a request for a change in a wireless resource configuration for a first time period to a first RU (e.g., a change in a TDD configuration), and may transmit an interference inquiry associated with the requested wireless resource configuration to a second RU. The wireless node may transmit a data payload to the first RU for transmission to a UE based on a response from the second RU to the interference inquiry. In cases where the response from the second RU indicates that interference from the requested wireless resource configuration is unlikely, the data payload may be based on the requested resource configuration, and otherwise the data payload may be based on a prior or default resource configuration.

A method for wireless communications at a radio unit is described. The method may include receiving, from a first network node of a first network operator, a first request for wireless resources in a first time period, receiving, from a second network node of a second network operator, a second request for wireless resources in the first time period, determining a first resource allocation for the first time period based on a first priority associated with the first network operator and a second priority associated with the second network operator, where at least a first subset of the first resource allocation is granted to the first network node and at least a second subset of the first resource allocation is granted to the second network node, and transmitting the first resource allocation to the first network node and the second network node.

An apparatus for wireless communications at a radio unit is described. The apparatus may include a processor, memory coupled with the processor, and instructions stored in the memory. The instructions may be executable by the processor to cause the apparatus to receive, from a first network node of a first network operator, a first request for wireless resources in a first time period, receive, from a second network node of a second network operator, a second request for wireless resources in the first time period, determine a first resource allocation for the first time period based on a first priority associated with the first network operator and a second priority associated with the second network operator, where at least a first subset of the first resource allocation is granted to the first network node and at least a second subset of the first resource allocation is granted to the second network node, and transmit the first resource allocation to the first network node and the second network node.

Another apparatus for wireless communications at a radio unit is described. The apparatus may include means for receiving, from a first network node of a first network operator, a first request for wireless resources in a first time period, means for receiving, from a second network node of a second network operator, a second request for wireless resources in the first time period, means for determining a first resource allocation for the first time period based on a first priority associated with the first network operator and a second priority associated with the second network operator, where at least a first subset of the first resource allocation is granted to the first network node and at least a second subset of the first resource allocation is granted to the second network node, and means for transmitting the first resource allocation to the first network node and the second network node.

A non-transitory computer-readable medium storing code for wireless communications at a radio unit is described. The code may include instructions executable by a processor to receive, from a first network node of a first network operator, a first request for wireless resources in a first time period, receive, from a second network node of a second network operator, a second request for wireless resources in the first time period, determine a first resource allocation for the first time period based on a first priority associated with the first network operator and a second priority associated with the second network operator, where at least a first subset of the first resource allocation is granted to the first network node and at least a second subset of the first resource allocation is granted to the second network node, and transmit the first resource allocation to the first network node and the second network node.

In some examples of the method, apparatuses, and non-transitory computer-readable medium described herein, the determining may include operations, features, means, or instructions for determining the first subset of the first resource allocation as a total amount of resources requested in the first request based on the first priority being a higher priority than the second priority and determining the second subset of the first resource allocation based on a remaining amount of resources in the first time period outside of the first subset of the first resource allocation. In some examples of the method, apparatuses, and non-transitory computer-readable medium described herein, the first resource allocation is associated with a first frequency band, and where a second frequency band has separate resources that are allocated independently of the first frequency band, and where the first network operator has a different priority relative to the second network operator in each of the first frequency band and the second frequency band. In some examples of the method, apparatuses, and non-transitory computer-readable medium described herein, the determining may include operations, features, means, or instructions for determining that a highest priority network operator has not reserved any resources within the first time period and allocating the wireless resources within the first time period to one or more network nodes associated with one or more lower priority network operators.

Some examples of the method, apparatuses, and non-transitory computer-readable medium described herein may further include operations, features, means, or instructions for receiving, from the first network node, a requested resource configuration associated with one or more time periods and transmitting an interference indication to the first network node that is based on a compatibility between the requested resource configuration and one or more other resource configurations associated with one or more other network nodes. In some examples of the method, apparatuses, and non-transitory computer-readable medium described herein, the requested resource configuration changes a time division duplexing configuration of the one or more time periods. In some examples of the method, apparatuses, and non-transitory computer-readable medium described herein, the requested resource configuration is for a secondary channel associated with the first network node, and where one or more other radio units have priority for the secondary channel. In some examples of the method, apparatuses, and non-transitory computer-readable medium described herein, the requested resource configuration is for a primary channel to confirm compatibility between the requested resource configuration and a resource configuration of one or more adjacent channels to the primary channel.

In some examples of the method, apparatuses, and non-transitory computer-readable medium described herein, the receiving the first request may include operations, features, means, or instructions for receiving, from the first network node prior to an expiration of an inactivity timer, data that is to be transmitted to one or more users and determining the wireless resources in the first time period based on an amount of the data that is to be transmitted. In some examples of the method, apparatuses, and non-transitory computer-readable medium described herein, the receiving the first request may include operations, features, means, or instructions for receiving, from the first network node after an expiration of an inactivity timer, an explicit request for the wireless resources in the first time period. In some examples of the method, apparatuses, and non-transitory computer-readable medium described herein, the determining may include operations, features, means, or instructions for determining that a reservation deadline associated with the first time period has expired and determining the second subset of the first resource allocation based on resources within the first time period that are unreserved by the first network node prior to the reservation deadline.

A method for wireless communications at a network node is described. The method may include transmitting, to a first radio unit, a request for a wireless resource configuration for a first time period, transmitting, to a second radio unit, an interference inquiry associated with the wireless resource configuration for the first time period, receiving, from the second radio unit, a response to the interference inquiry, and transmitting, based on the response to the interference inquiry, a payload to the first radio unit for transmission during the first time period.

An apparatus for wireless communications at a network node is described. The apparatus may include a processor, memory coupled with the processor, and instructions stored in the memory. The instructions may be executable by the processor to cause the apparatus to transmit, to a first radio unit, a request for a wireless resource configuration for a first time period, transmit, to a second radio unit, an interference inquiry associated with the wireless resource configuration for the first time period, receive, from the second radio unit, a response to the interference inquiry, and transmit, based on the response to the interference inquiry, a payload to the first radio unit for transmission during the first time period.

Another apparatus for wireless communications at a network node is described. The apparatus may include means for transmitting, to a first radio unit, a request for a wireless resource configuration for a first time period, means for transmitting, to a second radio unit, an interference inquiry associated with the wireless resource configuration for the first time period, means for receiving, from the second radio unit, a response to the interference inquiry, and means for transmitting, based on the response to the interference inquiry, a payload to the first radio unit for transmission during the first time period.

A non-transitory computer-readable medium storing code for wireless communications at a network node is described. The code may include instructions executable by a processor to transmit, to a first radio unit, a request for a wireless resource configuration for a first time period, transmit, to a second radio unit, an interference inquiry associated with the wireless resource configuration for the first time period, receive, from the second radio unit, a response to the interference inquiry, and transmit, based on the response to the interference inquiry, a payload to the first radio unit for transmission during the first time period.

In some examples of the method, apparatuses, and non-transitory computer-readable medium described herein, the request for the wireless resource configuration changes a time division duplexing configuration of the first time period. In some examples of the method, apparatuses, and non-transitory computer-readable medium described herein, the request for the wireless resource configuration is for a secondary channel associated with the network node, and where one or more different network nodes have priority for the secondary channel. In some examples of the method, apparatuses, and non-transitory computer-readable medium described herein, the request for the wireless resource configuration is for a primary channel to confirm compatibility between the requested wireless resource configuration and a resource configuration of one or more adjacent channels to the primary channel.

Some examples of the method, apparatuses, and non-transitory computer-readable medium described herein may further include operations, features, means, or instructions for transmitting, to a third radio unit based on the response to the interference inquiry, one or more constraints on one or more attributes associated with wireless communications in at least the first time period. In some examples of the method, apparatuses, and non-transitory computer-readable medium described herein, the one or more attributes include one or more of a time domain duplexing configuration, a power spectral density (PSD) constraint, an effective isotropic radiated power (EIRP) constraint, a sub-band restriction, or any combinations thereof.

Some examples of the method, apparatuses, and non-transitory computer-readable medium described herein may further include operations, features, means, or instructions for transmitting, to the first radio unit based on the receiving the response to the interference inquiry, a first request for wireless resources in the first time period and receiving, from the first radio unit responsive to the first request for wireless resources, a first resource allocation for the first time period based on a first priority associated with the network node and a second priority associated with a different network node. In some examples of the method, apparatuses, and non-transitory computer-readable medium described herein, the first resource allocation is based at least in part the first priority being a higher priority than the second priority, and the different network node is allocated resources in the first time period based on a remaining amount of resources in the first time period outside of the first resource allocation.

In some examples of the method, apparatuses, and non-transitory computer-readable medium described herein, the first resource allocation is associated with a first frequency band, and where a second frequency band has separate resources that are allocated independently of the first frequency band, and where different network nodes have different priorities in each of the first frequency band and the second frequency band. In some examples of the method, apparatuses, and non-transitory computer-readable medium described herein, the first radio unit allocates resources to lower priority network nodes based on higher priority network nodes reserving less than all available resources within the first time period.

DETAILED DESCRIPTION

Figure 1:
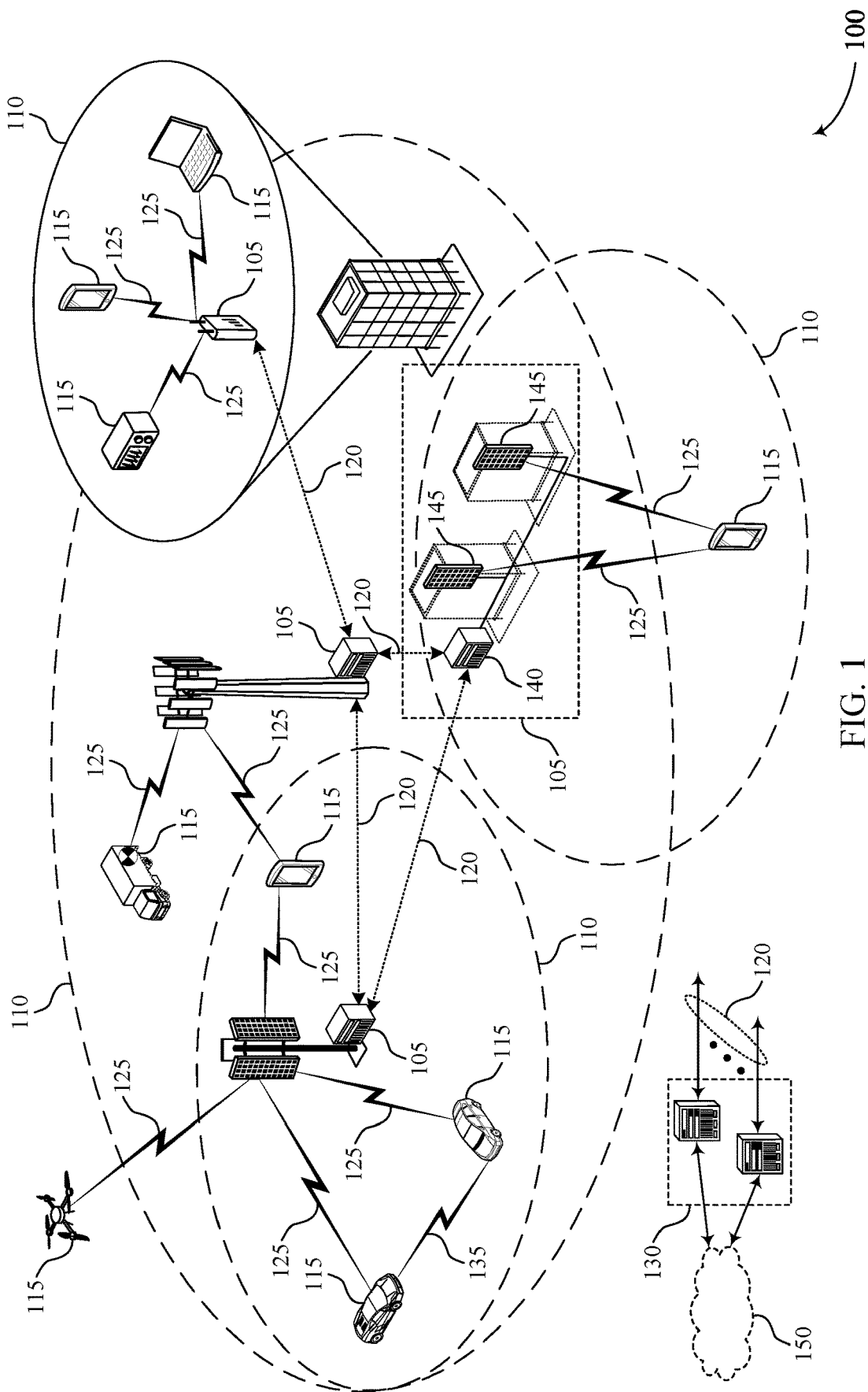
FIG. 1 illustrates an example of a wireless communications system that supports RU sharing techniques in wireless communications in accordance with aspects of the present disclosure.

Various aspects of the present disclosure provide techniques for multiple operators (e.g., mobile network operators (MNOs)) to perform spectrum sharing using shared radio units (RUs), where the multiple different operators can access a same RU for transmission and reception of over the air signals to and from a user equipment (UE) or multiple UEs. In various existing deployments, operators may use dedicated spectrum for communications, in which one or more frequency bands may be used by a particular operator exclusively. In such cases, one or more operators may have certain periods of time during which some or all portions of the spectrum are unused, while another operator may experience congestion. For example, if relatively few UEs are in a particular area of a first operator, or relatively few UEs are transmitting/receiving data traffic, the first operator may not need all of the available wireless resources of its dedicated spectrum. However, a second operator having UEs within an overlapping coverage area may be spectrum-constrained and traffic delays due to unavailability of wireless resources may result (e.g., if the second operator has a relatively large number of UEs in the area that are transmitting/receiving data traffic). Such situations may result in inefficient overall spectrum usage, as some portion of the first operator's spectrum is unused while UEs of the second operator may be experiencing delays due to limited resources of the second operator. In accordance with various techniques discussed herein, efficient techniques are provided for enhanced spectrum usage efficiency.

In some aspects, networks of multiple different operators may share RUs, where a RU may provide the over-the-air interface with one or more UEs. The shared RUs may make wireless resources available to network nodes, such as different central units (CUs) and/or distributed units (DUs) of different network operators, based on an operator priority. In some cases, a first operator may have priority for a first frequency band of radio frequency (RF) spectrum, and may share one or more RUs with a second operator that has priority for a second frequency band of the RF spectrum (e.g., and additional operators may have priority for one or more other frequency bands). A RU may receive a request for resources from DUs of multiple different operators, and prioritize allocation of resources based on a priority associated with an operator of each DU. The first operator may have a highest priority for the first frequency range of the RU, and the second operator may have a lower priority for the first frequency range, and resource requests of the second operator may be granted for resources that are unused by the first operator.

Further, in some cases a DU of the first operator may determine that a different resource configuration may be beneficial based on traffic of served UEs, and may request the resource configuration from a RU. The DU may also transmit an interference inquiry to one or more other RUs to confirm that the requested resource configuration does not cause interference at the other RUs. For example, changing a time division duplexing (TDD) configuration at a first RU may result in interference at a second RU with a different TDD configuration used by a different operator. Based on the result if the interference inquiry, the DU may transmit a payload to the first RU for use with the changed configuration if interference issues are unlikely, or with a default or previous configuration if the requested configuration is likely to cause interference.

Such techniques may allow for enhanced spectrum usage efficiency, which may enhance overall user experience for each network operator. Further, through prioritized sharing, a network operator may have priority for associated resources (e.g., a frequency band), and different network operators may be differentiated based on key performance indicators (KPIs), such as overall network latency, data rates, and the like. Thus, techniques as discussed herein may allow regulators or RF spectrum managers to enhance utilization of scarce wireless resources while also promoting competition and innovation through KPI differences between different operators.

Aspects of the disclosure are initially described in the context of wireless communications systems. Various aspects of RF spectrum sharing and related network architectures and process flows are then discussed. Aspects of the disclosure are further illustrated by and described with reference to apparatus diagrams, system diagrams, and flowcharts that relate to RU sharing techniques in wireless communications.

FIG. 1 illustrates an example of a wireless communications system 100 that supports RU sharing techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC) or distributed unit (DU), or a co-located central unit (CU) and DU. Each access network entity 140 may communicate with the UEs 115 through one or more other access network transmission entities 145, which may be referred to as RUs, radio heads, smart radio heads, or transmission/reception points (TRPs). Each access network transmission entity 145 may include one or more antenna panels and provide over-the-air transmissions/receptions with UEs 115. In some configurations, various functions of each access network entity 140 or base station 105 may be distributed across various network devices (e.g., CUs, DUs, and RUs) according to a disaggregated architecture, or may be consolidated into a single network device (e.g., a base station 105). While various aspects of the disclosure discuss RU sharing in a disaggregated architecture, techniques as discussed herein may in some cases be implemented on consolidated architectures as well.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, multiple operators may access wireless communications network 100 and perform spectrum sharing using shared RUs, where the multiple different operators can access a same RU for transmission and reception of over the air signals to and from one or more UEs 115. In some cases, a shared RU may receive requests for resources from two or more network nodes (e.g., DUs) of different operators, for wireless resources in a first time period. The RU may determine a first resource allocation for the first time period based on different priorities of the different operators. In some cases, a first network operator may have a higher priority than a second network operator, and resources may be allocated to the first network operator ahead of the second network operator. The RU may transmit the first resource allocation to each of the different network nodes that provided the request.

In some cases, interference management between RUs may be managed through interference inquiries to determine whether a particular resource configuration (e.g., a TDD configuration) of one RU is likely to cause interference at another RU. Based on responses to the interference inquiries, one or more resource configurations may be updated. In some cases, a network node, such as a CU and/or DU, may transmit a request for a change in a wireless resource configuration for a first time period to a first RU (e.g., a change in a TDD configuration), and may transmit an interference inquiry associated with the requested wireless resource configuration to a second RU. The wireless node may transmit a data payload to the first RU for transmission to a UE 115 based on a response from the second RU to the interference inquiry. In cases where the response from the second RU indicates that interference from the requested wireless resource configuration is unlikely, the data payload may be based on the requested resource configuration, and otherwise the data payload may be based on a prior or default resource configuration.

Figure 2:
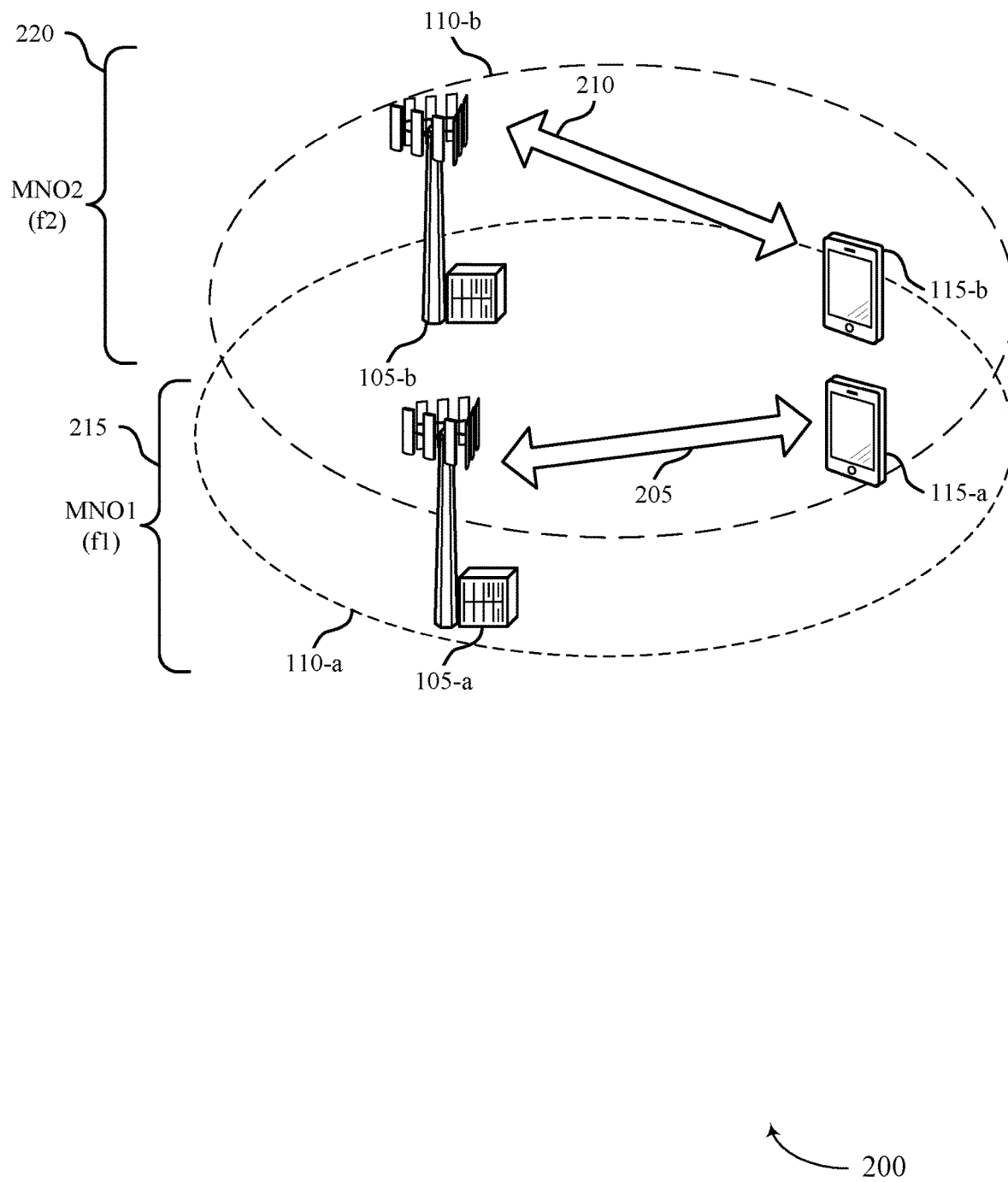
FIG. 2 illustrates an example of a portion of a wireless communications system that supports RU sharing techniques in wireless communications in accordance with aspects of the present disclosure.

FIG. 2 illustrates an example of a wireless communications system 200 that supports RU sharing techniques in wireless communications in accordance with aspects of the present disclosure. In some examples, the wireless communications system 200 may implement aspects of wireless communications system 100. Wireless communications system 200 may include a first base station 105-a and a second base station 105-b that may be examples of base stations 105 as described with respect to FIG. 1. The wireless communications system 200 may also include a first UE 115-a and a second UE 115-b that may be examples of UEs 115 as described with respect to FIG. 1.

Figure 4:
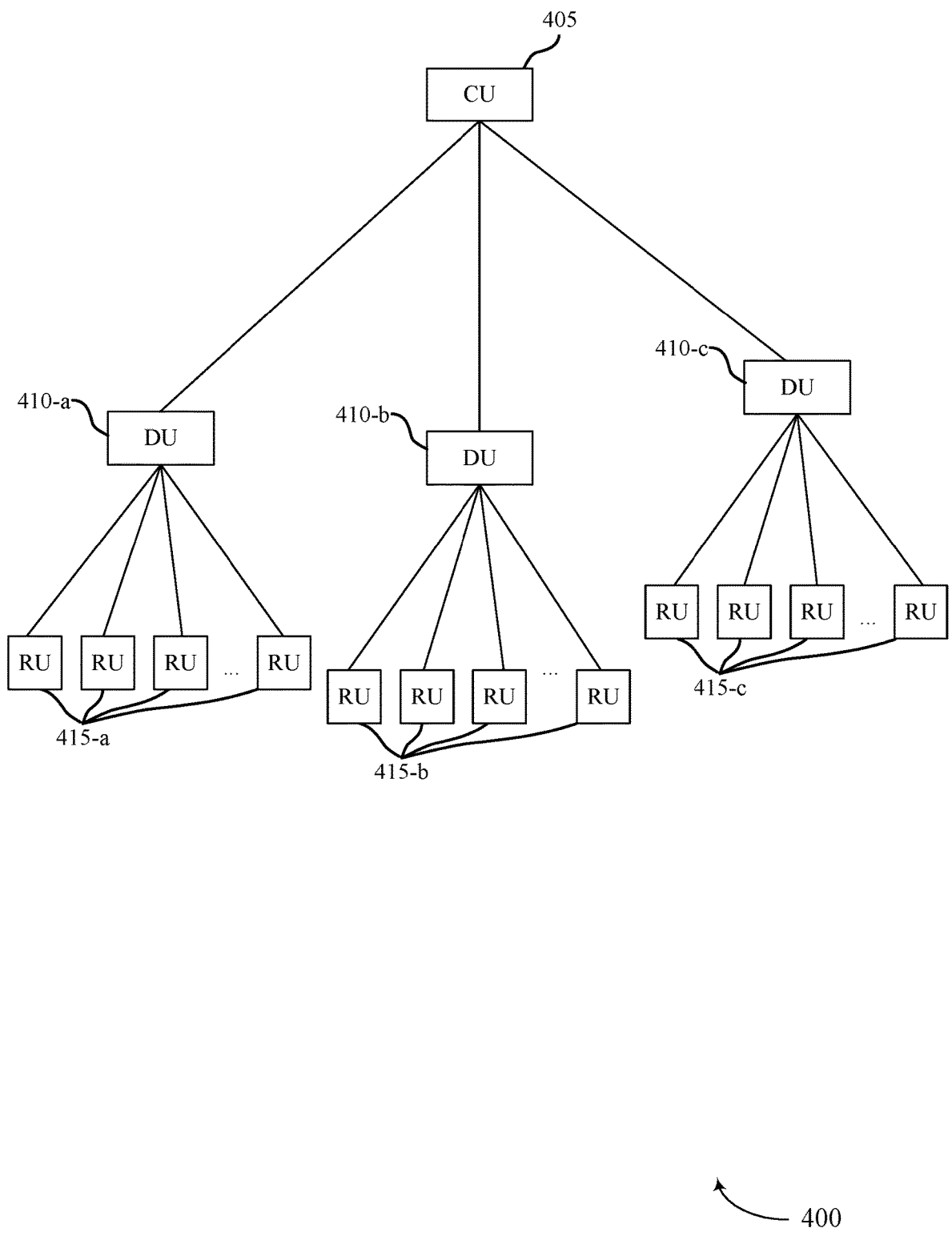
FIG. 4 illustrates an example of a disaggregated radio access network architecture that supports RU sharing techniques in wireless communications in accordance with aspects of the present disclosure.
Figure 5:
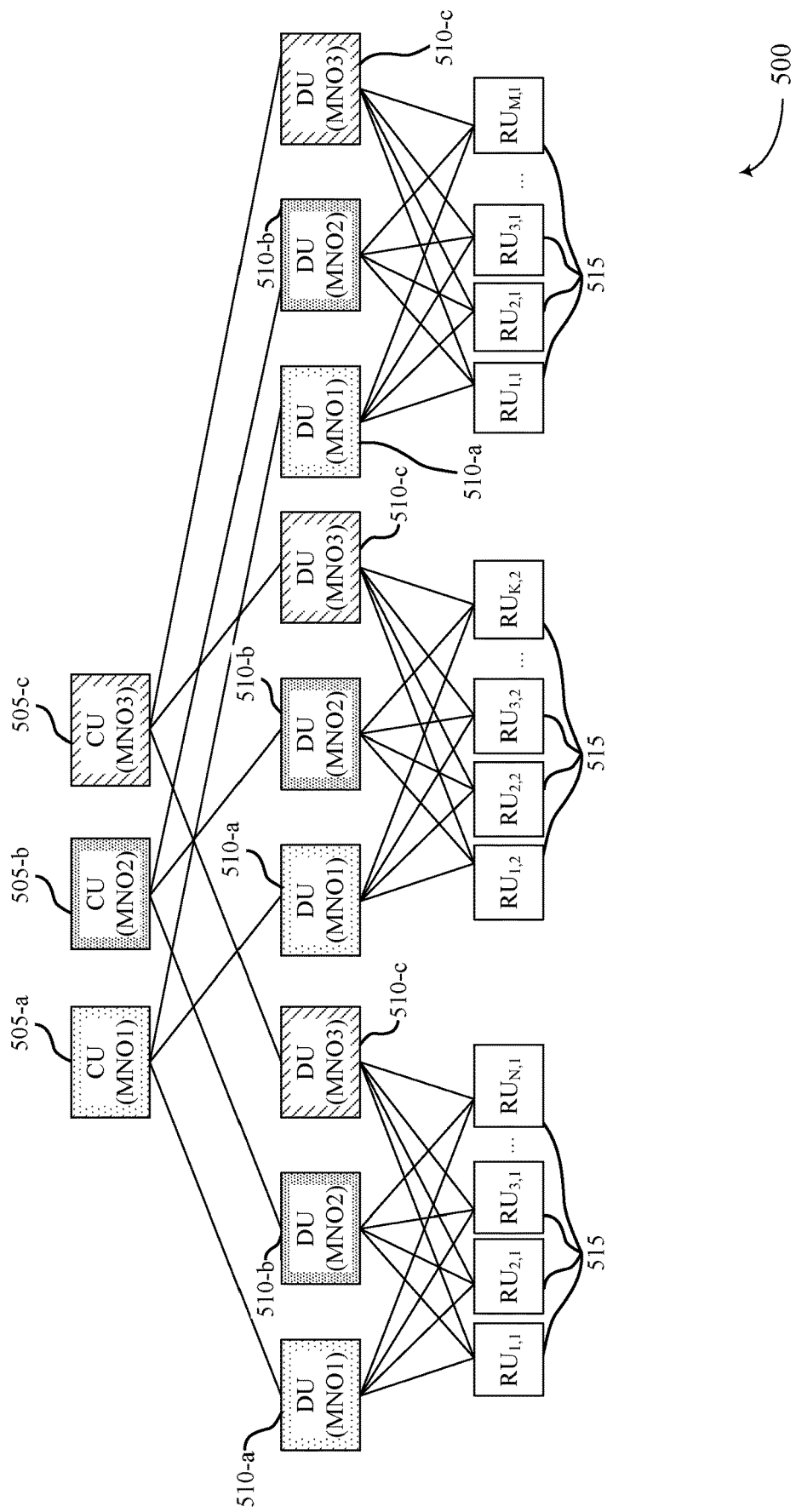
FIG. 5 illustrates an example of a RU sharing network architecture that supports RU sharing techniques in wireless communications in accordance with aspects of the present disclosure.

In this example, the first base station 105-a and first UE 115-a may be associated with a first MNO 215 (MNO1), and may communicate using first communication link 205 that uses a first frequency (f1) range. Likewise, the second base station 105-b and second UE 115-b may be associated with a second MNO 220 (MNO2), and may communicate using second communication link 210 that uses a second frequency (f2) range. As discussed herein, in cases where each of the first MNO 215 and the second MNO 220 exclusively use their own dedicated resources, the first MNO 215 may in some time periods have unused resources while the second MNO 220 has more data to transfer than can be accommodated by its dedicated resources in the time period. Further, one or more UEs 115 that are served by the second MNO 220 (e.g., the second UE 115-b) may be within a first coverage area 110-a of the first base station 105-a as well as within a second coverage area 110-b of the second base station. In accordance with various techniques discussed herein, in some cases a network node of the second MNO 220 (e.g., a DU) may request resources of the first MNO 215 (e.g., the first base station 105-a or an associated RU). Examples of wireless resources and prioritized sharing of resources are illustrated in FIGS. 3A and 3B, and exemplary radio access network (RAN) architectures for providing prioritized sharing of resources are illustrated in FIGS. 4 and 5.

Figure 3A:
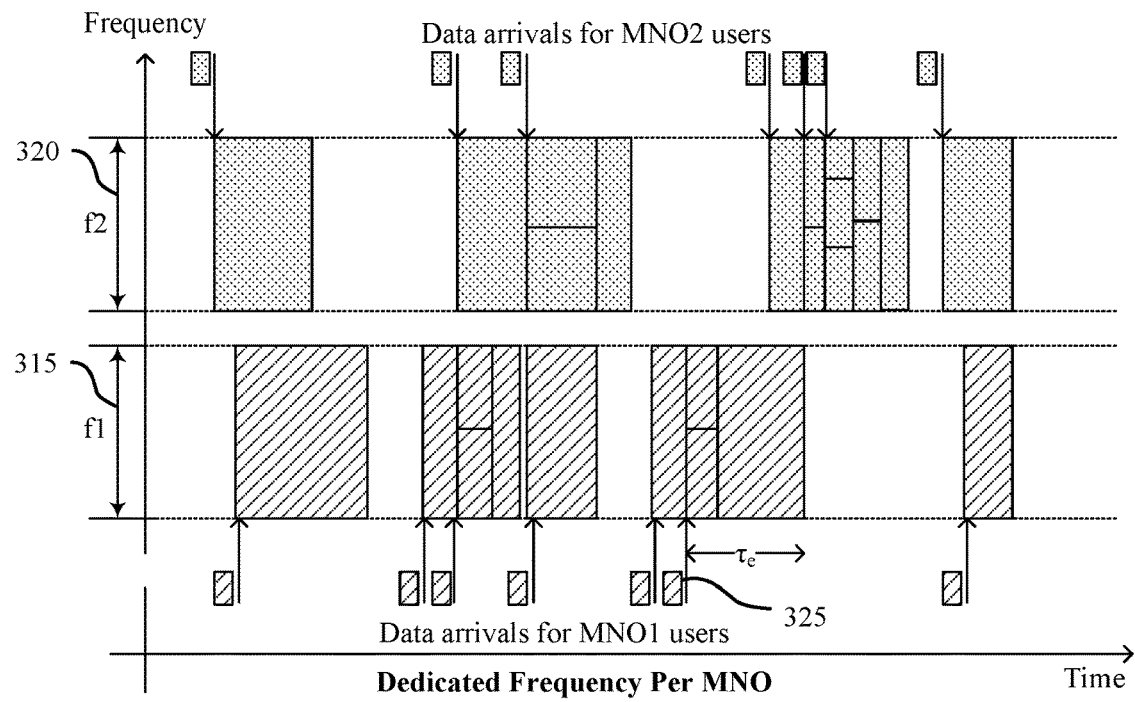
FIGS. 3A and 3B illustrate examples of wireless resource usage with dedicated frequencies per operator and for prioritized sharing of frequencies among operators in accordance with aspects of the present disclosure.
Figure 3B:
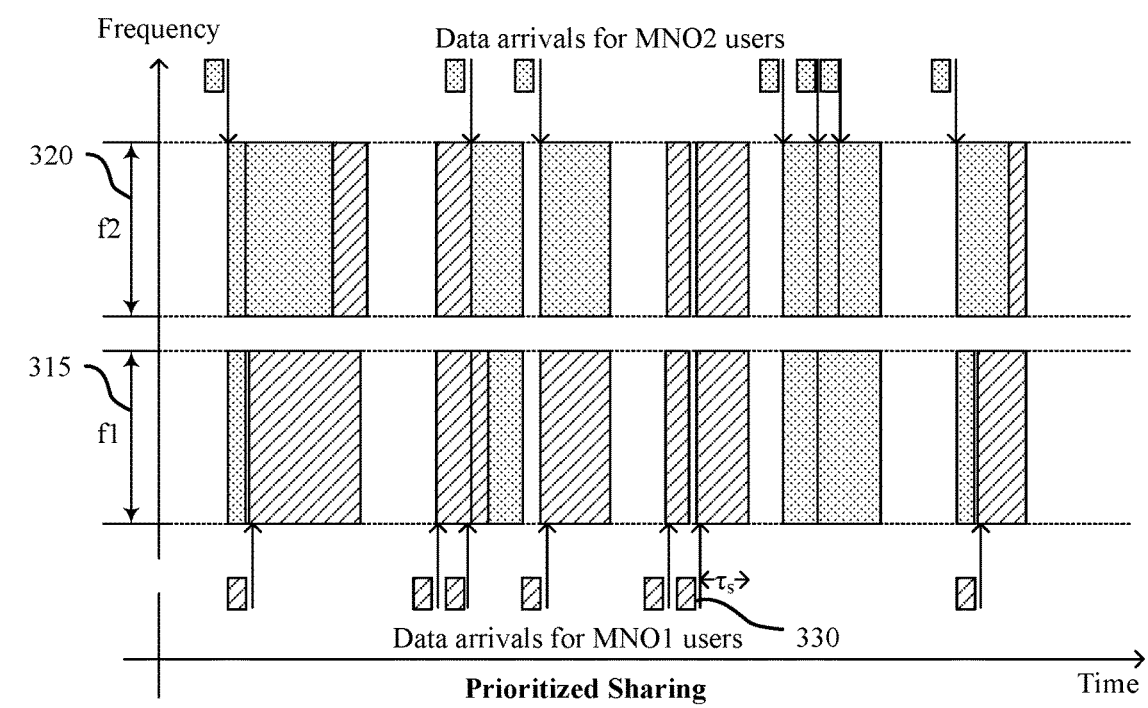

FIG. 3A illustrates an example of dedicated wireless resource usage 300, and FIG. 3B illustrates an example of prioritized sharing of wireless resources 350, in accordance with aspects of the present disclosure. In some examples, the wireless resources 300 and 350 may implement aspects of wireless communications system 100 or 200. In the examples of FIG. 3, two MNOs are illustrated that each have an associated set of frequencies. While two MNOs and two corresponding priorities are illustrated, it is to be understood that techniques discussed herein may be applied for cases where two or more MNOs may be present, with each MNO having an associated priority relative to other MNOs for determining resource allocations.

In the example of FIG. 3A, a first MNO (MNO1) may use a first set of frequencies 315 (f1) for communicating with one or more UEs, and a second MNO (MNO2) may use a second set of frequencies 320 (f2) for communicating with one or more UEs. When sharing of resources is not enabled, such as illustrated in FIG. 3A, data arrivals for each MNO are simply transmitted using associated resources that are available. Thus, in such cases, first MNO data 305 may be transmitted using the first set of frequencies 315 and second MNO data 310 may be transmitted using the second set of frequencies 320. Thus, in cases where a relatively large amount of data is to be transmitted, such as indicated at 325, a relatively long amount of time, indicated as $\tau_c$, may be needed to transmit all of the data.

In the example of FIG. 3B, prioritized sharing may be implemented in which the first MNO may share resources of the first set of frequencies 315 with the second MNO, such that second MNO data 310 may be transmitted on the first set of frequencies 315 in the event that first MNO data 305 is not being transmitted. Thus, in this example, for transmissions on the first set of frequencies 315, the first MNO data 305 may have priority over the second MNO data 310. Likewise, for transmissions on the second set of frequencies 320, the second MNO data 310 may have priority over the first MNO data 305. In this example, where the relatively large amount of data at 325 may be transmitted using both the first set of frequencies 315 and the second set of frequencies 320, as indicated at 330, the result may be that a shorter amount of time, indicated as $\tau_s$, relative to the time $\tau_e$ would be used for transmitting the data. Thus, the experienced latency is reduced in some cases with prioritized sharing as illustrated in FIG. 3B compared the scenario without sharing as illustrated in FIG. 3A (e.g., $\tau_e$ (for separate networks)≥$\tau_s$ (for RAN sharing)). Further, the prioritization of MNOs allows for RAN sharing with KPIs that may not be identical, and thus different MNOs may continue to differentiate themselves, which may help enhance marketplace competition and innovation. In some cases, an open-RAN (O-RAN) architecture, such as illustrated in FIG. 5 and based on a disaggregated architecture as illustrated in FIG. 4, may help achieve spectrum sharing and still allow MNOs to differentiate their KPIs.

FIG. 4 illustrates an example of a disaggregated RAN architecture 400 that supports RU sharing techniques in wireless communications in accordance with aspects of the present disclosure. In some examples, the disaggregated RAN architecture 400 may implement aspects of wireless communications system 100 or 200.

In the example of FIG. 4, a CU 405 may be interconnected with multiple DUs 410. For example, control plane (CP) functions of CU 405 may be handled at a CU-CP component that communicates with DUs 410 via a F1-C interface, and user plane (UP) functions of CU 405 may be handled at a CU-UP component that communicates with DUs 410 via a F1-U interface. Such a disaggregated RAN architecture, along with standardized interfaces among main RAN components (e.g., the F1-C and F1-U interfaces, Xn interfaces, NG interfaces, and the like) may provide an open RAN (O-RAN) environment that provides MNOs an opportunity to diversify their network suppliers. Further, such an architecture may provide enhanced network redundancy, where multiple DUs 410 may be connected to CU 405 (or multiple CUs), and multiple RUs 415 may be connected to one or multiple DUs 410. Each RU 415 may be a separate cell or a number of RUs 415 can belong to the same cell. In accordance with various aspects as discussed herein, one or more RUs 415 may be shared RUs 415 that may be interconnected with DUs 410 of multiple different MNOs, such as illustrated in FIG. 5, for various examples.

FIG. 5 illustrates an example of a RU sharing network architecture 500 that supports RU sharing techniques in wireless communications in accordance with aspects of the present disclosure. In some examples, the RU sharing network architecture 500 may implement aspects of wireless communications system 100 or 200.

In the example of FIG. 5, multiple CUs 505 associated with different MNOs may be interconnected with multiple associated DUs 510. In this example, a first CU 505-a may be associated with a first MNO and interconnected with multiple associated DUs 510-a of the first MNO. Likewise, second CU 505-b and third CU 505-c may be associated with a second MNO and third MNO, respectively, and interconnected with corresponding DUs 510-b and 510-c. A number of RUs 515 may be shared among all of the MNOs, and in this example each RU 515 may be interconnected with a DU 510 of each MNO. Thus, multiple DUs belonging to different MNOs may be connected to a common, shared RU 515. Each RU 515 may be configured to transmit and receive (e.g., via one or multiple antenna panels) on different frequencies, such that spectrum associated with each MNO (e.g., f1 for MNO1, f2 for MNO2, and f3 for MNO3) is accessible via the RUs 515.

In some cases, one or multiple RUs 515 may be owned and operated by a site owner that may also own the spectrum for communications, and thus each MNO may have access to the site owners RUs 515 and spectrum. In such examples, the MNOs may not have purchased the spectrum, but may lease the spectrum from the site/spectrum owner. In other cases, one or more operators (e.g., each MNO) may own one or more shared RU 515 and an associated portion of the spectrum (e.g., a set of frequencies on which the MNO that owns the spectrum priority over all other operators, and where priority among the non-owning MNOs may be based on other factors, such as fee payment, reciprocal priority sharing, etc.). In some cases, governmental regulators or spectrum managers may influence RU sharing through policy and conditions when spectrum is auctioned. In some cases, each DU 510 may transmit a request for resources to one or more RUs 515, and the RU 515 may determine the available resources for each DU 510 and provide an indication back to the DU 510 of the resources that are available to the DU 510. An example of such a technique is illustrated in FIG. 6.

Figure 6:
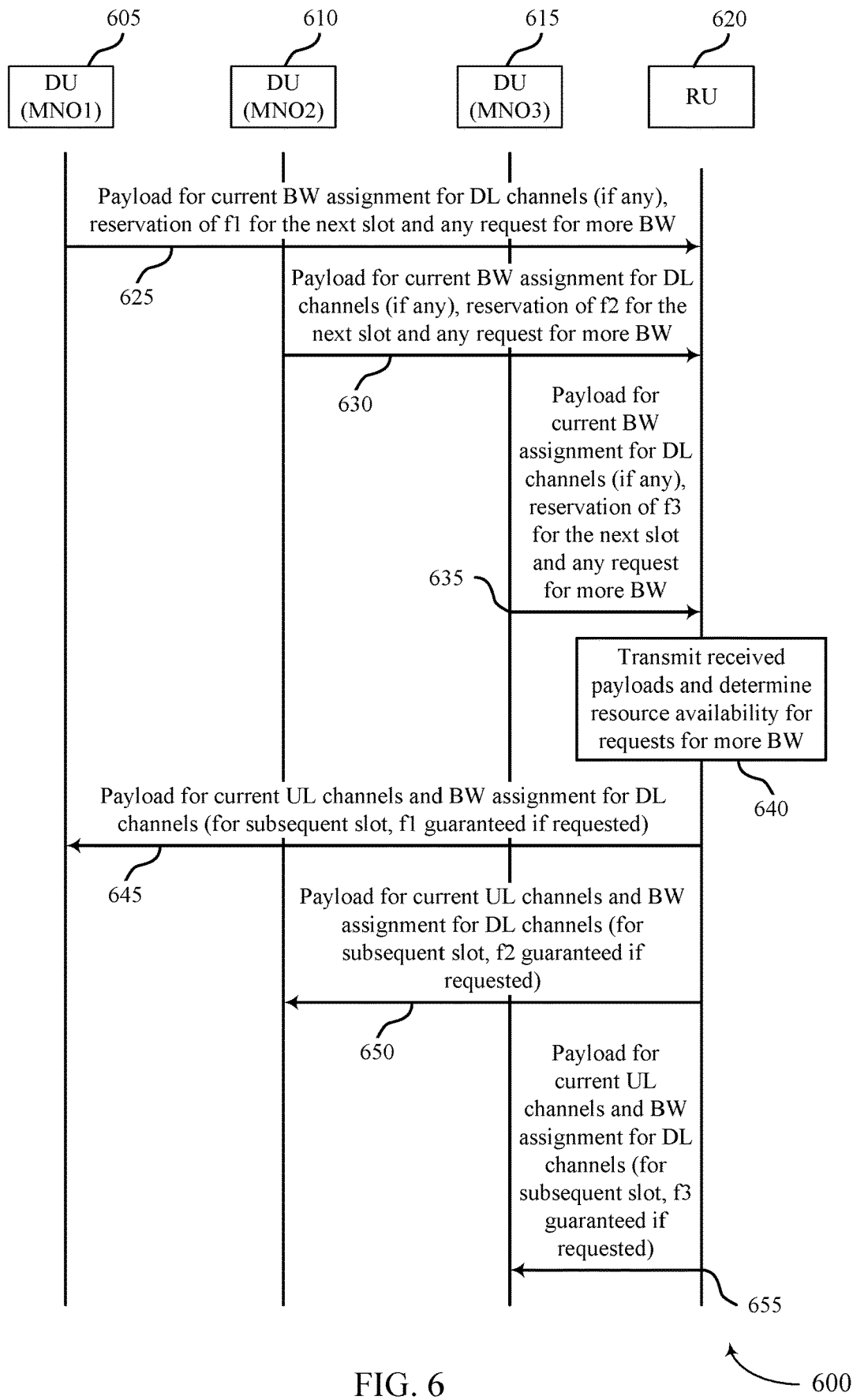
FIG. 6 illustrates an example of a process flow that supports RU sharing techniques in wireless communications in accordance with aspects of the present disclosure.

FIG. 6 illustrates an example of a process flow 600 that supports RU sharing techniques in wireless communications in accordance with aspects of the present disclosure. In some examples, the process flow 600 may implement aspects of a wireless communications systems 100 or 200, in disaggregated RAN architecture 400, or in RU sharing network architecture 500, as described with reference to FIGS. 1-2 and 4-5. The process flow 600 may include a first DU 605 of a first MNO, a second DU 610 of a second MNO, a third DU 615 of a third MNO, and a shared RU 620, which may be examples of the corresponding devices described herein, or components of a base station or gNB devices described herein. Alternative examples of the following may be implemented where some processes are performed in a different order than described or not performed at all. In some implementations, processes may include additional features not mentioned below, or further processes may be added.

At 625, the first DU 605 may transmit a payload for a current bandwidth (BW) assignment for downlink (DL) channels (if present) for a current time period or current slot, a reservation of the first MNO frequency (f1) for the next time period or slot, and any request for more BW (e.g., if additional BW beyond that available in f1 is requested for transmission of additional data), to the shared RU 620. The transmission may use an interface between the first DU 605 and shared RU 620 (e.g., a F1 interface such as F1-C and/or F1-U).

At 630, the second DU 610 may transmit a payload for a current BW assignment for DL channels (if present) for a current time period/slot, a reservation of the second MNO frequency (f2) for the next time period/slot, and any request for more BW (e.g., if additional BW beyond that available in f2 is requested for transmission of additional data), to the shared RU 620. The transmission may use an interface between the second DU 610 and shared RU 620 (e.g., a F1 interface such as F1-C and/or F1-U).

At 635, the third DU 615 may transmit a payload for a current BW assignment for DL channels (if present) for a current time period/slot, a reservation of the third MNO frequency (f3) for the next time period/slot, and any request for more BW (e.g., if additional BW beyond that available in f3 is requested for transmission of additional data), to the shared RU 620. The transmission may use an interface between the third DU 615 and shared RU 620 (e.g., a F1 interface such as F1-C and/or F1-U).

At 640, the shared RU 620 may transmit the received payloads to one or multiple UEs using the BW assignments associated with each payload, and may determine resource availability (e.g., BW assignments for f1, f2, and f3) for any requests for more BW. In some cases, the shared RU 620 may prioritize BW assignments per MNO frequency based on a prioritization associated with each MNO for the different MNO frequencies. For example, the first MNO may have a highest priority for f1, the second MNO may have a lower priority than the first MNO for f1, and the third MNO may have a lower priority than both the first and second MNOs for f1. Similarly, for f2, the second MNO may have a highest priority, followed by the third MNO and then the first MNO; and for f3 the third MNO may have a highest priority followed by the first MNO and then the second MNO. The shared RU 620 may determine the resource availability for each of f1, f2, and f3 for the next time period/slot based on the prioritization of the MNOs, the corresponding reserved resources, and any requests for more BW. For example, if the first MNO does not have data to transmit in the next time period/slot and both the second DU 610 and the third DU 615 requested more BW for the next time period/slot, the shared RU 620 may provide a DL assignment to the second DU 610 in f1 and in f2.

At 645, the shared RU 620 may transmit, to the first DU 605, uplink payload for current uplink channels and a BW assignment for DL channels for the subsequent slot, where resources in f1 are guaranteed if requested based on the first MNO having priority over any other MNOs for f1. The transmission may use an interface between the first DU 605 and shared RU 620 (e.g., a F1 interface such as F1-C and/or F1-U).

At 650, the shared RU 620 may transmit, to the second DU 610, uplink payload for current uplink channels and a BW assignment for DL channels for the subsequent slot, where resources in f2 are guaranteed if requested based on the second MNO having priority over any other MNOs for f2. The transmission may use an interface between the second DU 610 and shared RU 620 (e.g., a F1 interface such as F1-C and/or F1-U).

At 655, the shared RU 620 may transmit, to the third DU 615, uplink payload for current uplink channels and a BW assignment for DL channels for the subsequent slot, where resources in f3 are guaranteed if requested based on the third MNO having priority over any other MNOs for f3. The transmission may use an interface between the third DU 615 and shared RU 620 (e.g., a F1 interface such as F1-C and/or F1-U).

Such techniques thus provide a handshake procedure that may be utilized for resource reservation between the DUs and shared RU. In some cases, regulators or spectrum managers may incentivize prioritized use of resources with RU sharing, and thus MNOs may implement such sharing in order to obtain such incentives (e.g., access to other spectrum, lower cost, etc.). In some cases, for a given resource, priority MNOs may have an opportunity to reserve its priority resources first, and all unreserved resources can afterwards be offered to nonpriority MNOs. In some cases, prioritized resources may also be implicitly reserved based on activity (e.g., so long as data is being transmitted by the prioritized DU, other DUs are not provided with resources). Additionally, or alternatively, prioritized resources may need to be explicitly reserved only upon prolonged inactivity as measured by an inactivity timer. In such cases, the inactivity timer may be running at the RU and DU, such that the RU may be aware when the reservation expires so it can reassign resources to DUs from other MNOs, and the DU may be aware when the reservation expires to determine when it needs to reserve resources ahead of time. Non-prioritized resources may be assigned just in time on a slot-by-slot basis. In such cases, payload for the non-prioritized resource may need to be generated ahead of time and gated off if resources are unavailable.

Such shared RU resource allocation techniques may thus provide an opportunity for sharing spectrum and managing interference among MNOs. Further, the concept of prioritized resources per MNO can be utilized to meet quality of service (QoS) targets for each MNO and enhance performance of all MNO networks for the benefit of consumers and end-users. In some cases, spectrum licensing may be adopted where a site owner is also an RU owner as well as the spectrum licensee that may then lease the spectrum to MNOs, whose networks may be fully virtualized. Further, in some cases, regulators may influence the spectrum leasing terms to ensure fair access to the spectrum.

In some cases, one DU may have a sufficient amount of downlink data or uplink data to trigger a resource configuration change (e.g., a change in a TDD format to provide more downlink or uplink slots). However, if one RU changes its resource configuration, interference may be caused at other RUs. For example, if a first RU receives a request to switch an uplink slot to a downlink slot, and a second RU is in proximity to the first RU, such a change may cause significant interference at the second RU such that the second RU may be unlikely to receive uplink transmissions in that slot. In order to manage such potential interference, techniques are discussed for interference queries to RUs to determine whether a resource configuration change can be made. Various examples of such techniques are discussed with reference to FIGS. 7 and 8.

Figure 7:
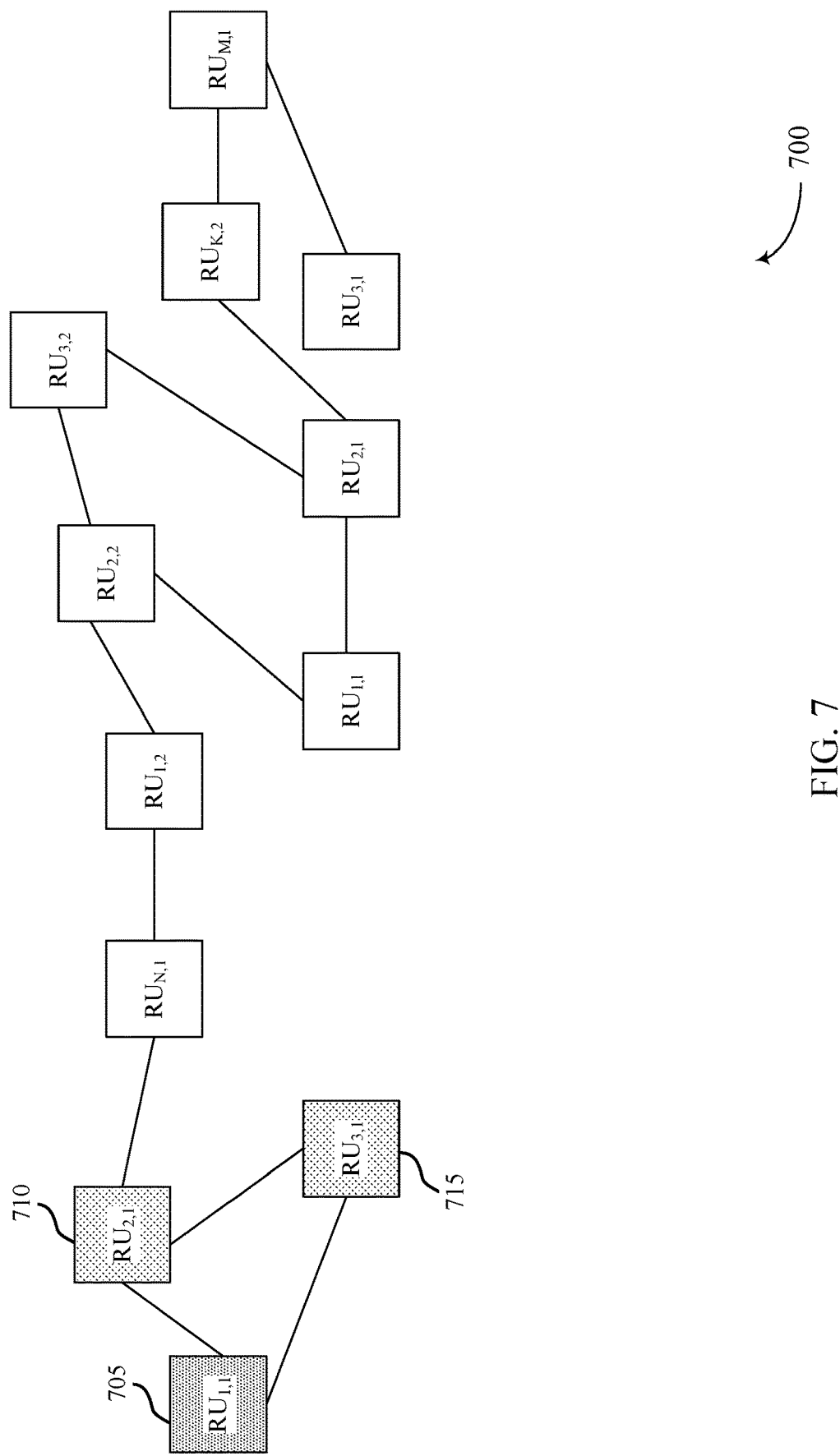
FIG. 7 illustrates an example of an interference graph that supports RU sharing techniques in wireless communications in accordance with aspects of the present disclosure.

FIG. 7 illustrates an example of an interference graph 700 that supports RU sharing techniques in wireless communications in accordance with aspects of the present disclosure.

In some examples, the interference graph 700 may be implemented in aspects of wireless communications system 100 or 200, in aspects of disaggregated RAN architecture 400, or in RU sharing network architecture 500.

In the example of FIG. 7, RU sharing may be implemented in which multiple RUs may transmit/receive communications for multiple DUs of multiple different MNOs, as discussed herein. A first RU 705 may receive a request from a DU to change a resource configuration (e.g., change a TDD configuration). Prior to implementing such a resource change, the requesting DU may query one or more neighboring RUs, such as second RU 710 and third RU 715. In some cases, a mapping of neighboring RUs for interference management may be provided to DUs. If both the second RU 710 and third RU 715 indicate that the requested change in the resource configuration would not impact interference, the first RU 705 may be instructed to make the change to the resource configuration, and otherwise the prior resource configuration or a default resource configuration may be maintained. For each RU, a resource configuration is aligned across all MNOs, and a same constraint exists for adjacent channels in TDD bands, and a downlink-to-uplink change, or uplink-to-downlink change, may be allowed if it does not impact neighboring RUs.

An interference graph such as illustrated in FIG. 7 may be constructed in order to understand which RUs are interfering, and DUs may be utilized to notify each RU connected by an interfering graph about other RU activity that can place a constraint on attributes associated with the utilized resource. In some cases, the interference graph 700 may be generated based on measurements at different RUs of signal strengths of neighboring RUs (e.g., reference signal received power (RSRP) measurements of reference signals transmitted by neighboring RUs), and if the measured signal strength exceeds a threshold value the associated RU may be added to the interference graph. In some cases, the interference graph of RUs may be provided to DUs that use shared RUs in order to allow the DU to query potentially affected DUs regarding a requested configuration change. The RU activity that may constrain resource configuration changes may include, for example, downlink/uplink direction changes, power spectral density (PSD) or effective isotropic radiated power (EIRP) changes, and/or changes on sub-band restrictions, to provide some non-limiting examples. In order to utilize a non-default configuration for a resource at the first RU 705, a DU connected to the first RU 705, based on interference graph 700, may need to ensure second RU 710 and third RU 715 agree with the change of the resource attributes.

In some cases, not all MNOs will need to use all RUs transmitting on a band in one area, but the interference graph connecting all RUs may be created to confirm a resource configuration change will not adversely impact other RUs. In some cases, a secondary channel user (e.g., a lower priority MNO) may obtain a bandwidth assignment from the RU it utilizes for transmission, and also obtain an acknowledgment or confirmation from all other RUs connected to the transmitting RU by the interference graph that non-default interference conditions can be tolerated. In some cases, use of the same resources by a different MNO using the same slot type may be easier to accommodate than a change of the slot type (e.g., from uplink to downlink). The same procedure may also be utilized to manage downlink/uplink subframes between adjacent channels without reuse of frequency resources.

Figure 8:
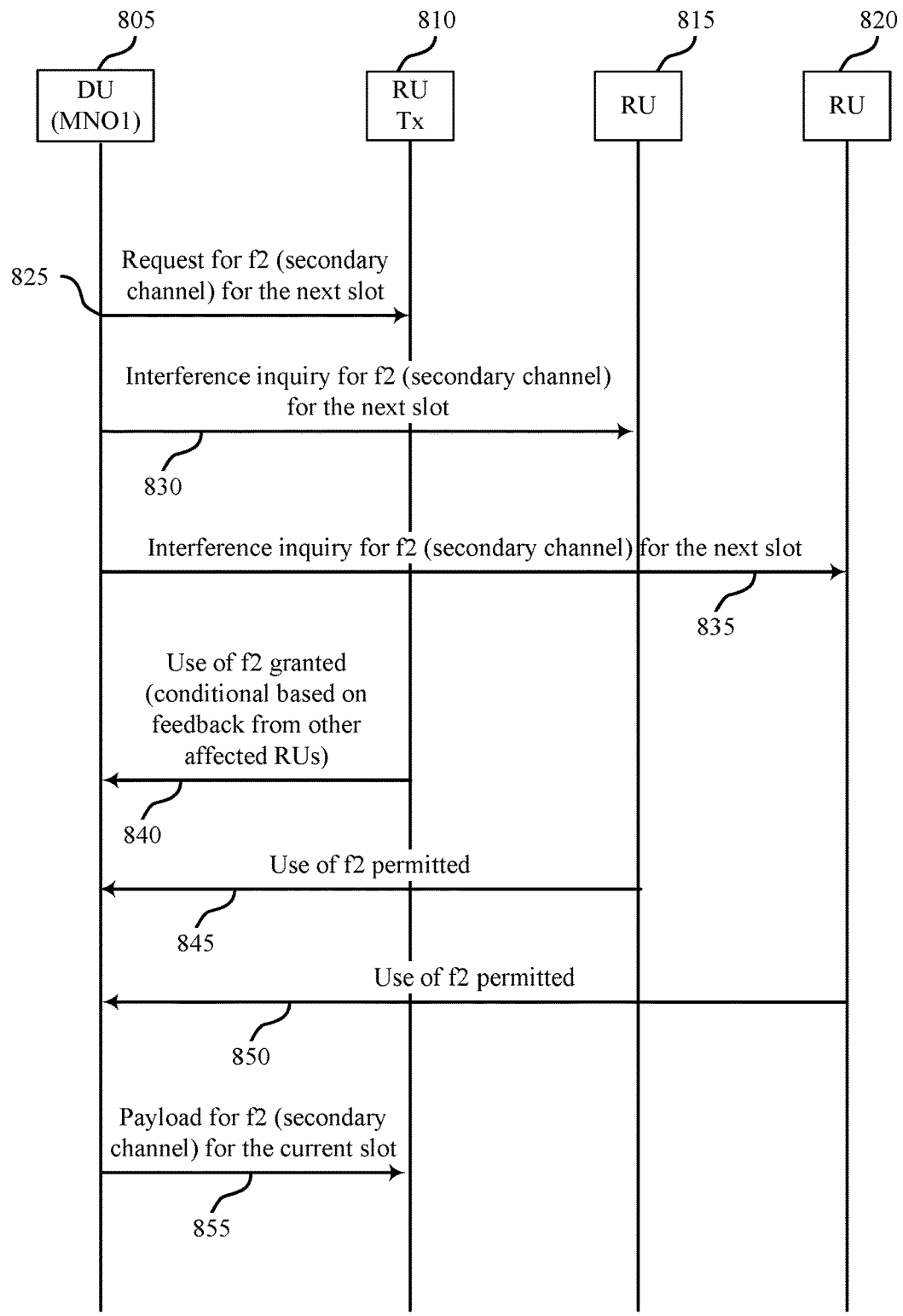
FIG. 8 illustrates an example of a process flow that supports RU sharing techniques in wireless communications in accordance with aspects of the present disclosure.

FIG. 8 illustrates an example of a process flow 800 that supports RU sharing techniques in wireless communications in accordance with aspects of the present disclosure. In some examples, the process flow 800 may implement aspects of a wireless communications systems 100 or 200, in disaggregated RAN architecture 400, or in RU sharing network architecture 500, as described with reference to FIGS. 1-2 and 4-5. The process flow 800 may include a DU 805 of a first MNO, a first shared RU 810 that is a transmitting RU, a second shared RU 815, and a third shared RU 820, which may be examples of the corresponding devices described herein, or components of a base station or gNB devices described herein. Alternative examples of the following may be implemented where some processes are performed in a different order than described or not performed at all. In some implementations, processes may include additional features not mentioned below, or further processes may be added.

At 825, the DU 805 may be associated with a first MNO having a priority channel of f1, and may transmit a request for resources from f2 (e.g., a secondary channel) for the next slot. In some cases, the request for resources from the secondary channel may be based on an amount of data that is present to be transmitted for the DU 805, and the request may include an indication of a change in a resource configuration for the next slot (e.g., a TDD configuration may be requested to be changed to have additional downlink slots when a large amount of downlink data is to be transmitted).

At 830, the DU 805 may transmit an interference inquiry for the secondary channel (f2) for the next slot to the second RU 815. In some cases, the interference inquiry may be transmitted to the second RU 815 based on an interference graph associated with the first RU 810 (e.g., an interference graph such as illustrated in FIG. 7 that is generated based on signal strengths of neighboring RUs).

At 835, the DU 805 may transmit an interference inquiry for the secondary channel (f2) for the next slot to the third RU 820. In some cases, the interference inquiry may be transmitted to the third RU 820 based on an interference graph associated with the first RU 810 (e.g., an interference graph such as illustrated in FIG. 7 that is generated based on signal strengths of neighboring RUs).

At 840, the first RU 810 may transmit, to the DU 805, an indication of whether the use of the secondary channel (f2) is granted, which may be conditional based on feedback from other affected RUs.

At 845, the second RU 815 may transmit an indication that the requested resource configuration for the secondary channel (f2) is permitted. Further, in this example, at 850, the third RU 820 may transmit an indication that the requested resource configuration for the secondary channel (f2) is permitted.

At 855, based on the received indications from the RUs, the DU 805 may transmit the payload for the secondary channel (f2) to the first RU 810 for transmission based on the changed resource configuration. In other cases, in the event that one or more of the other RUs indicate that the changed resource configuration is not permitted (e.g., based on a level of expected interference and other communications in the associated slot), the DU 805 may use a prior configuration or default resource configuration.

Figure 9:
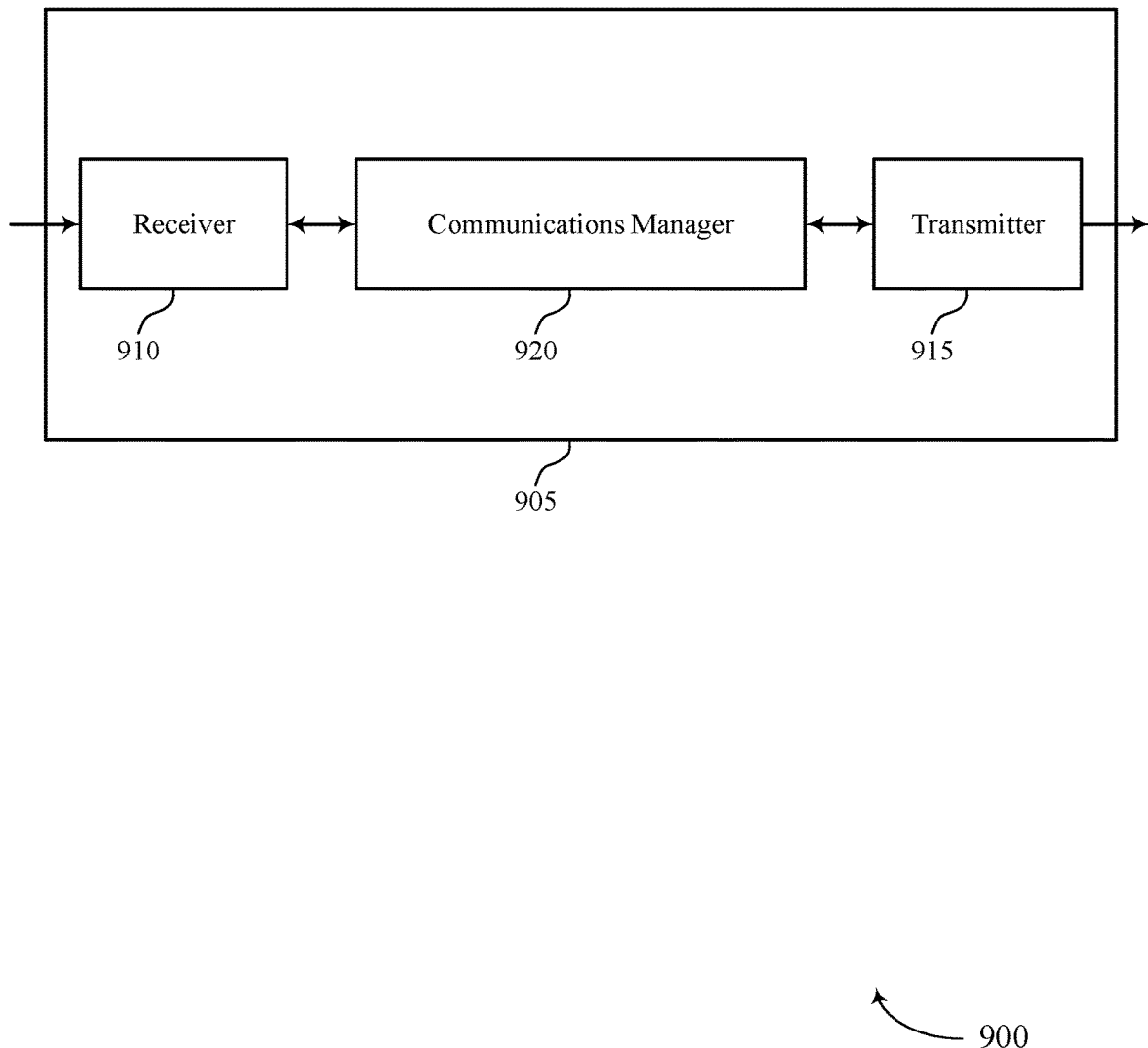
FIGS. 9 and 10 show block diagrams of devices that support RU sharing techniques in wireless communications in accordance with aspects of the present disclosure.

FIG. 9 shows a block diagram 900 of a device 905 that supports RU sharing techniques in wireless communications in accordance with aspects of the present disclosure. The device 905 may be an example of aspects of a RU as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to RU sharing techniques in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to RU sharing techniques in wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of RU sharing techniques in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a RU in accordance with examples as disclosed herein. For example, the communications manager 920 may be configured as or otherwise support a means for receiving, from a first network node of a first network operator, a first request for wireless resources in a first time period. The communications manager 920 may be configured as or otherwise support a means for receiving, from a second network node of a second network operator, a second request for wireless resources in the first time period. The communications manager 920 may be configured as or otherwise support a means for determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The communications manager 920 may be configured as or otherwise support a means for transmitting the first resource allocation to the first network node and the second network node.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

Figure 10:
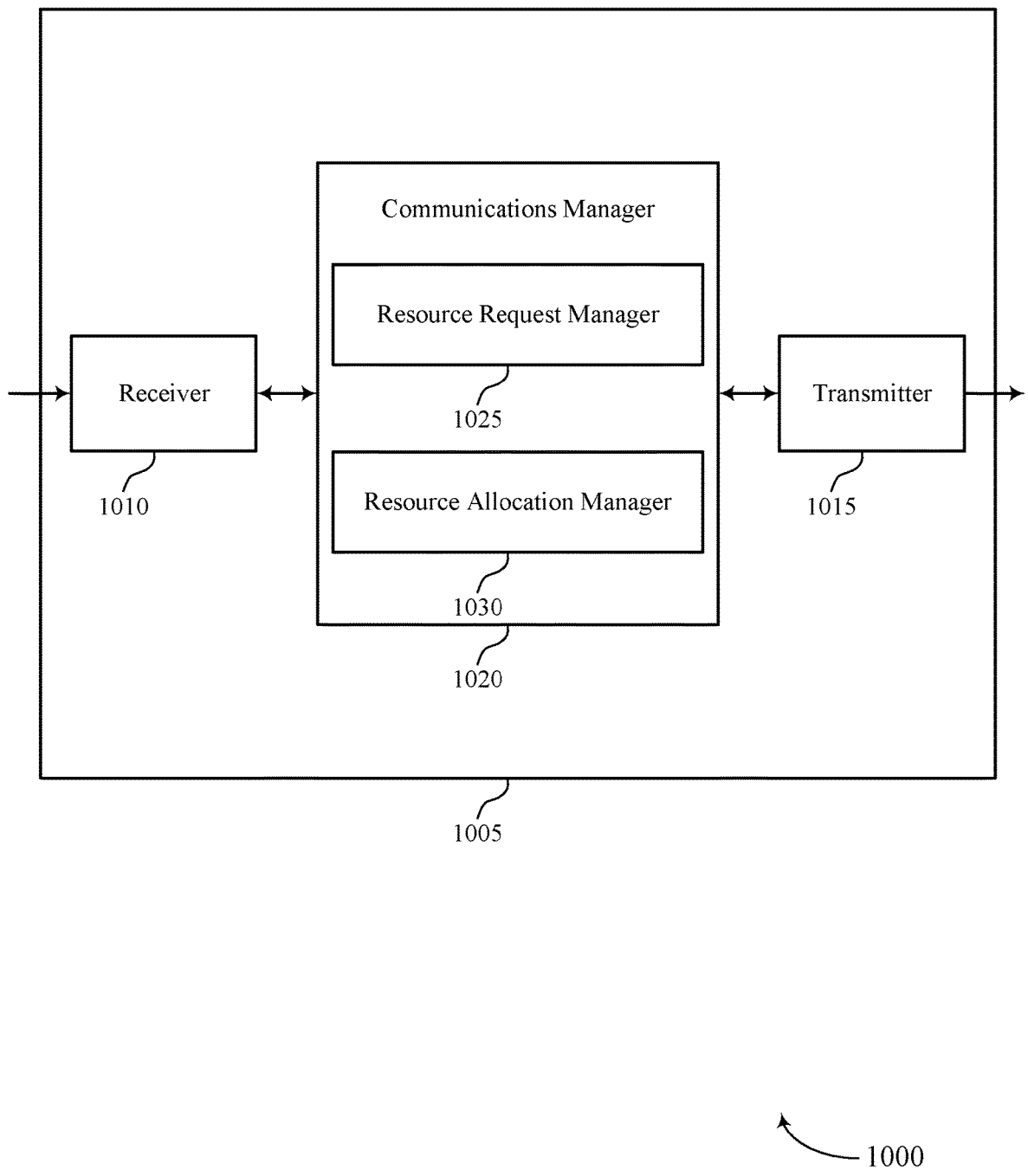

FIG. 10 shows a block diagram 1000 of a device 1005 that supports RU sharing techniques in wireless communications in accordance with aspects of the present disclosure. The device 1005 may be an example of aspects of a device 905 or a RU as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to RU sharing techniques in wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to RU sharing techniques in wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of RU sharing techniques in wireless communications as described herein. For example, the communications manager 1020 may include a resource request manager 1025 a resource allocation manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a RU in accordance with examples as disclosed herein. The resource request manager 1025 may be configured as or otherwise support a means for receiving, from a first network node of a first network operator, a first request for wireless resources in a first time period. The resource request manager 1025 may be configured as or otherwise support a means for receiving, from a second network node of a second network operator, a second request for wireless resources in the first time period. The resource allocation manager 1030 may be configured as or otherwise support a means for determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The resource allocation manager 1030 may be configured as or otherwise support a means for transmitting the first resource allocation to the first network node and the second network node.

Figure 11:
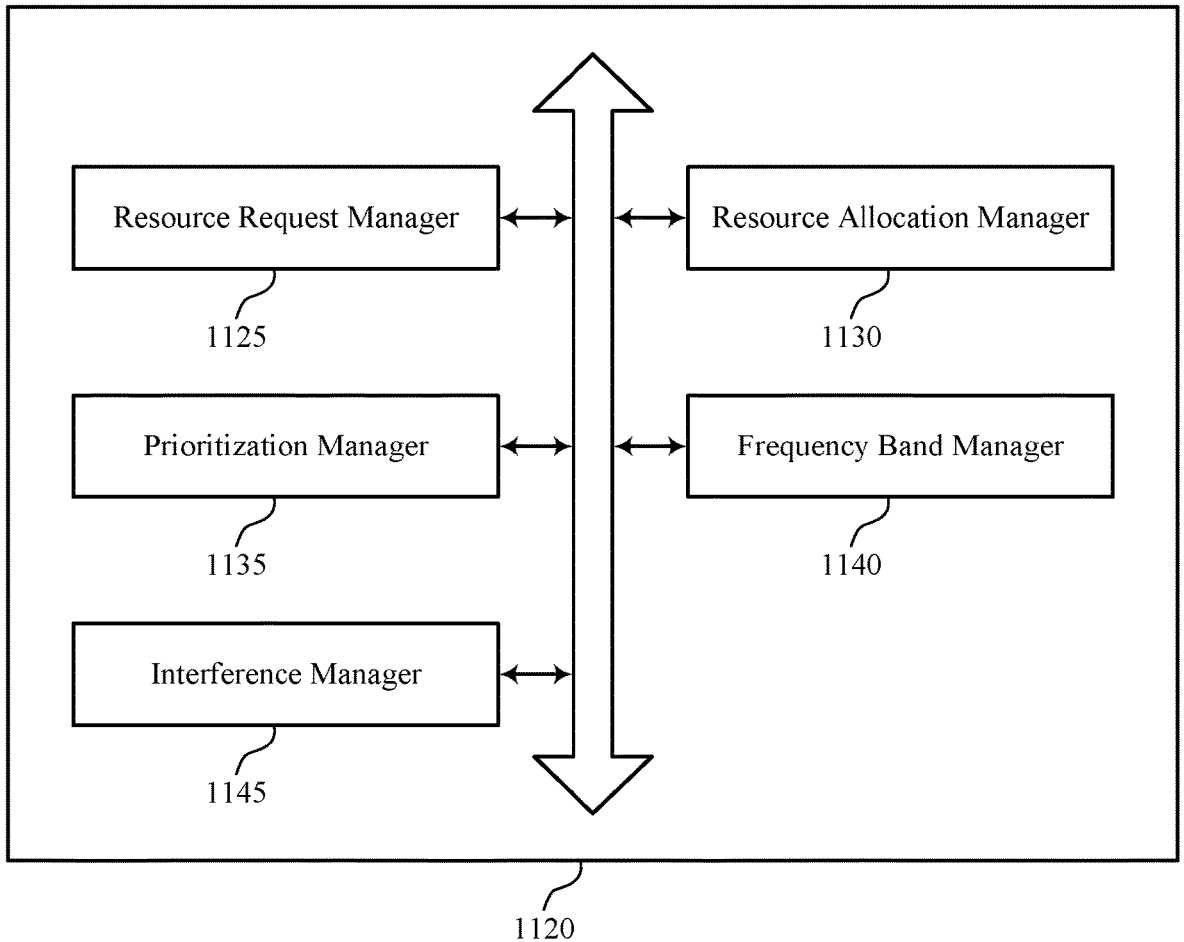
FIG. 11 shows a block diagram of a communications manager that supports RU sharing techniques in wireless communications in accordance with aspects of the present disclosure.

FIG. 11 shows a block diagram 1100 of a communications manager 1120 that supports RU sharing techniques in wireless communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of RU sharing techniques in wireless communications as described herein. For example, the communications manager 1120 may include a resource request manager 1125, a resource allocation manager 1130, a prioritization manager 1135, a frequency band manager 1140, an interference manager 1145, or any combination thereof. Each of these components may communicate, directly or indirectly, with one another (e.g., via one or more buses).

The communications manager 1120 may support wireless communications at a RU in accordance with examples as disclosed herein. The resource request manager 1125 may be configured as or otherwise support a means for receiving, from a first network node of a first network operator, a first request for wireless resources in a first time period. In some examples, the resource request manager 1125 may be configured as or otherwise support a means for receiving, from a second network node of a second network operator, a second request for wireless resources in the first time period. The resource allocation manager 1130 may be configured as or otherwise support a means for determining a first resource allocation for the first time period based on a first priority associated with the first network operator and a second priority associated with the second network operator, where at least a first subset of the first resource allocation is granted to the first network node and at least a second subset of the first resource allocation is granted to the second network node. In some examples, the resource allocation manager 1130 may be configured as or otherwise support a means for transmitting the first resource allocation to the first network node and the second network node.

In some examples, to support determining the first resource allocation, the prioritization manager 1135 may be configured as or otherwise support a means for determining the first subset of the first resource allocation as a total amount of resources requested in the first request based on the first priority being a higher priority than the second priority. In some examples, to support determining, the prioritization manager 1135 may be configured as or otherwise support a means for determining the second subset of the first resource allocation based on a remaining amount of resources in the first time period outside of the first subset of the first resource allocation. In some examples, the first resource allocation is associated with a first frequency band, and where a second frequency band has separate resources that are allocated independently of the first frequency band, and where the first network operator has a different priority relative to the second network operator in each of the first frequency band and the second frequency band.

In some examples, to support determining the first resource allocation, the prioritization manager 1135 may be configured as or otherwise support a means for determining that a highest priority network operator has not reserved any resources within the first time period. In some examples, to support determining, the prioritization manager 1135 may be configured as or otherwise support a means for allocating the wireless resources within the first time period to one or more network nodes associated with one or more lower priority network operators.

In some examples, the interference manager 1145 may be configured as or otherwise support a means for receiving, from the first network node, a requested resource configuration associated with one or more time periods. In some examples, the interference manager 1145 may be configured as or otherwise support a means for transmitting an interference indication to the first network node that is based on a compatibility between the requested resource configuration and one or more other resource configurations associated with one or more other network nodes. In some examples, the requested resource configuration changes a time division duplexing configuration of the one or more time periods. In some examples, the requested resource configuration is for a secondary channel associated with the first network node, and where one or more other RUs have priority for the secondary channel. In some examples, the requested resource configuration is for a primary channel to confirm compatibility between the requested resource configuration and a resource configuration of one or more adjacent channels to the primary channel.

In some examples, to support receiving the first request, the resource request manager 1125 may be configured as or otherwise support a means for receiving, from the first network node prior to an expiration of an inactivity timer, data that is to be transmitted to one or more users. In some examples, to support receiving the first request, the resource allocation manager 1130 may be configured as or otherwise support a means for determining the wireless resources in the first time period based on an amount of the data that is to be transmitted.

In some examples, to support receiving the first request, the resource allocation manager 1130 may be configured as or otherwise support a means for receiving, from the first network node after an expiration of an inactivity timer, an explicit request for the wireless resources in the first time period. In some examples, to support determining the first resource allocation, the resource allocation manager 1130 may be configured as or otherwise support a means for determining that a reservation deadline associated with the first time period has expired. In some examples, to support determining the first resource allocation, the resource allocation manager 1130 may be configured as or otherwise support a means for determining the second subset of the first resource allocation based on resources within the first time period that are unreserved by the first network node prior to the reservation deadline.

Figure 12:
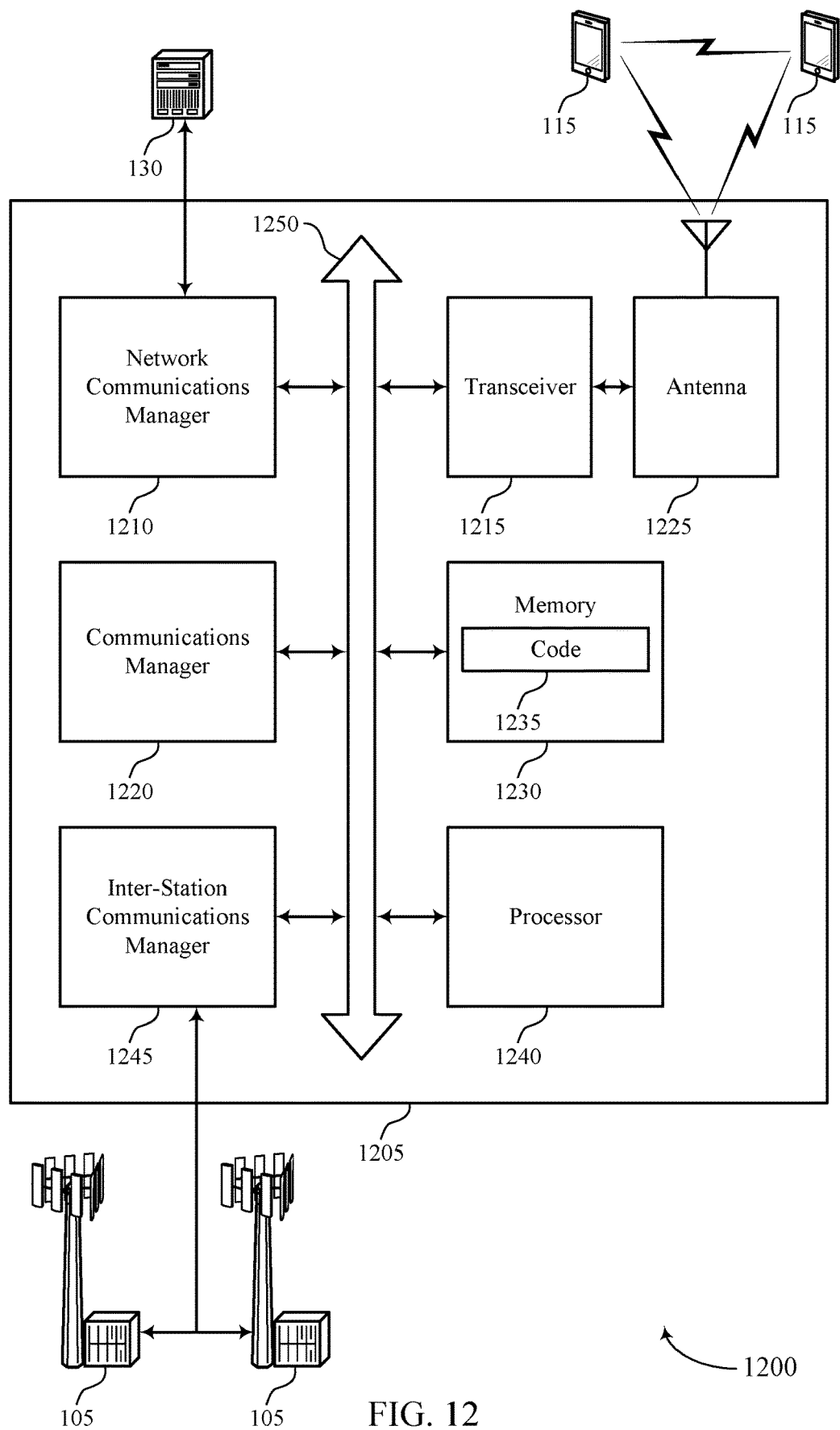
FIG. 12 shows a diagram of a system including a device that supports RU sharing techniques in wireless communications in accordance with aspects of the present disclosure.

FIG. 12 shows a diagram of a system 1200 including a device 1205 that supports RU sharing techniques in wireless communications in accordance with aspects of the present disclosure. The device 1205 may be an example of or include the components of a device 905, a device 1005, or a RU as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting RU sharing techniques in wireless communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a RU in accordance with examples as disclosed herein. For example, the communications manager 1220 may be configured as or otherwise support a means for receiving, from a first network node of a first network operator, a first request for wireless resources in a first time period. The communications manager 1220 may be configured as or otherwise support a means for receiving, from a second network node of a second network operator, a second request for wireless resources in the first time period. The communications manager 1220 may be configured as or otherwise support a means for determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The communications manager 1220 may be configured as or otherwise support a means for transmitting the first resource allocation to the first network node and the second network node.

By including or configuring the communications manager 1220 in accordance with examples as described herein, the device 1205 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of RU sharing techniques in wireless communications as described herein, or the processor 1240 and the memory 1230 may be otherwise configured to perform or support such operations.

Figure 13:
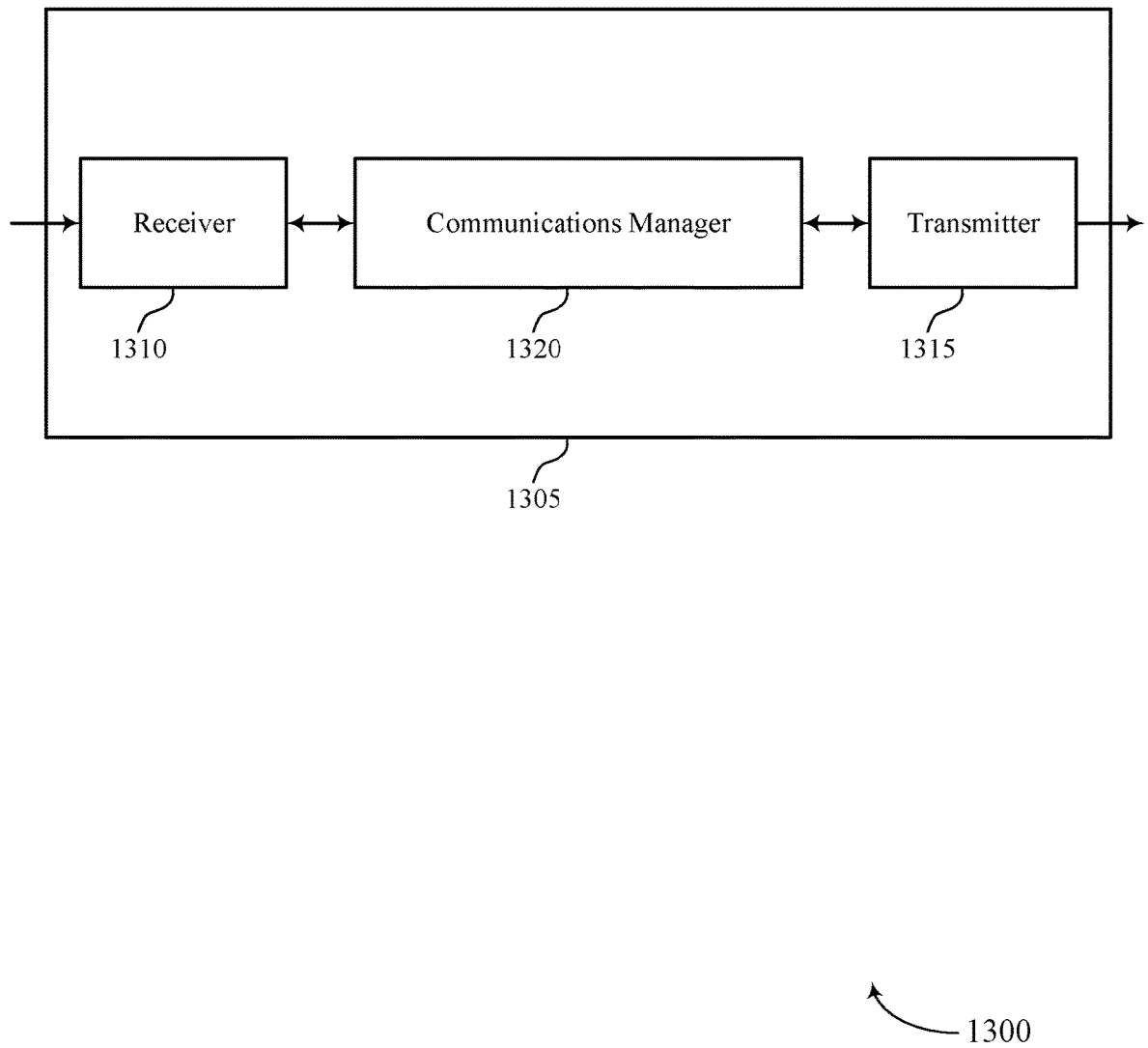
FIGS. 13 and 14 show block diagrams of devices that support RU sharing techniques in wireless communications in accordance with aspects of the present disclosure.

FIG. 13 shows a block diagram 1300 of a device 1305 that supports RU sharing techniques in wireless communications in accordance with aspects of the present disclosure. The device 1305 may be an example of aspects of a DU as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to RU sharing techniques in wireless communications). Information may be passed on to other components of the device 1305. The receiver 1310 may utilize a network interface, or one or more antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to RU sharing techniques in wireless communications). In some examples, the transmitter 1315 may be co-located with a receiver 1310 in a transceiver module. The transmitter 1315 may utilize a network interface, or a single antenna or a set of multiple antennas.

The communications manager 1320, the receiver 1310, the transmitter 1315, or various combinations thereof or various components thereof may be examples of means for performing various aspects of RU sharing techniques in wireless communications as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a network node in accordance with examples as disclosed herein. For example, the communications manager 1320 may be configured as or otherwise support a means for transmitting, to a first RU, a request for a wireless resource configuration for a first time period. The communications manager 1320 may be configured as or otherwise support a means for transmitting, to a second RU, an interference inquiry associated with the wireless resource configuration for the first time period. The communications manager 1320 may be configured as or otherwise support a means for receiving, from the second RU, a response to the interference inquiry. The communications manager 1320 may be configured as or otherwise support a means for transmitting, based on the response to the interference inquiry, a payload to the first RU for transmission during the first time period.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

Figure 14:
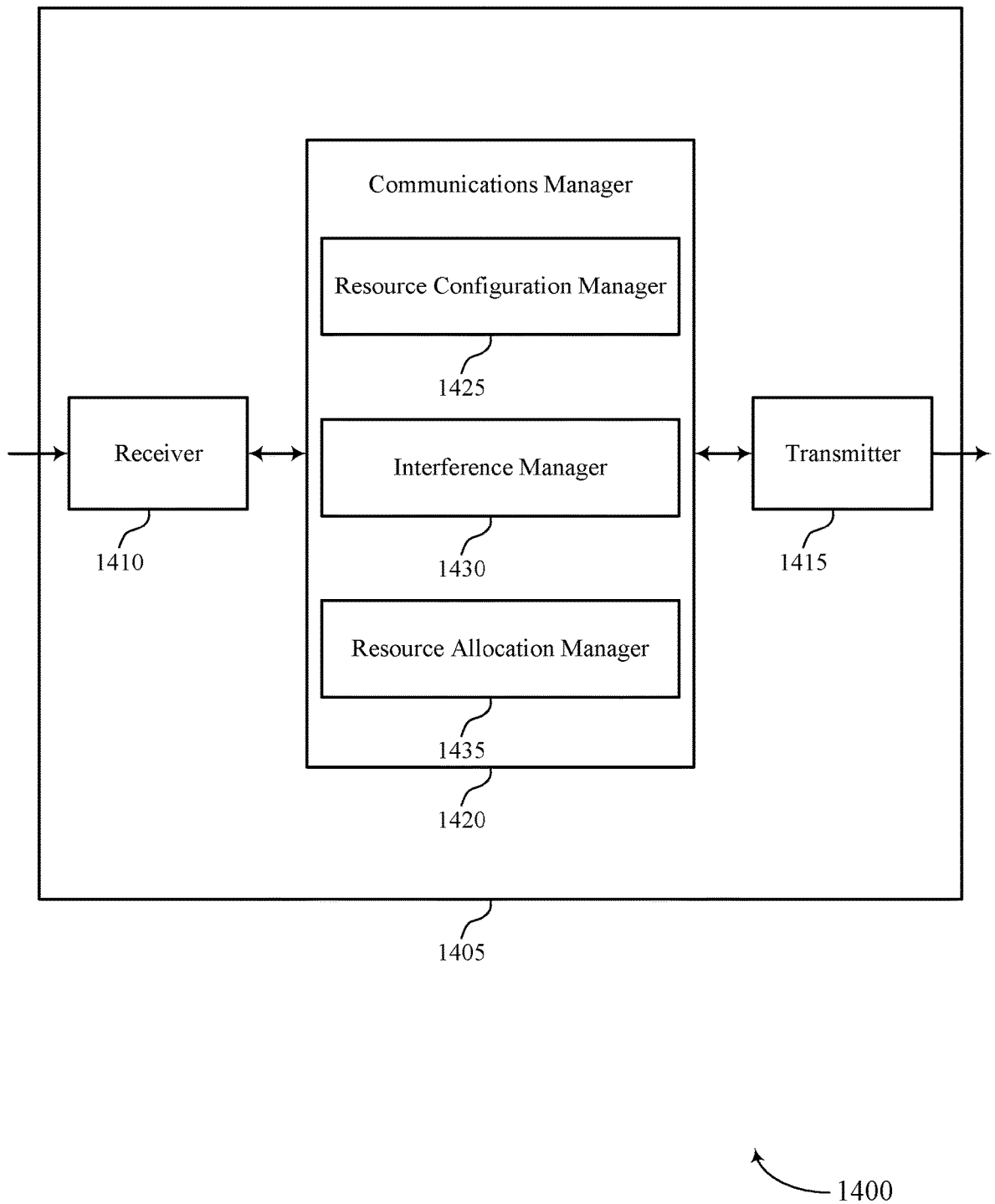

FIG. 14 shows a block diagram 1400 of a device 1405 that supports RU sharing techniques in wireless communications in accordance with aspects of the present disclosure. The device 1405 may be an example of aspects of a device 1305 or a DU as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to RU sharing techniques in wireless communications). Information may be passed on to other components of the device 1405. The receiver 1410 may utilize a network interface, or a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to RU sharing techniques in wireless communications). In some examples, the transmitter 1415 may be co-located with a receiver 1410 in a transceiver module. The transmitter 1415 may utilize a network interface, or a single antenna or a set of multiple antennas.

The device 1405, or various components thereof, may be an example of means for performing various aspects of RU sharing techniques in wireless communications as described herein. For example, the communications manager 1420 may include a resource configuration manager 1425, an interference manager 1430, a resource allocation manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a network node in accordance with examples as disclosed herein. The resource configuration manager 1425 may be configured as or otherwise support a means for transmitting, to a first RU, a request for a wireless resource configuration for a first time period. The interference manager 1430 may be configured as or otherwise support a means for transmitting, to a second RU, an interference inquiry associated with the wireless resource configuration for the first time period. The interference manager 1430 may be configured as or otherwise support a means for receiving, from the second RU, a response to the interference inquiry. The resource allocation manager 1435 may be configured as or otherwise support a means for transmitting, based on the response to the interference inquiry, a payload to the first RU for transmission during the first time period.

Figure 15:
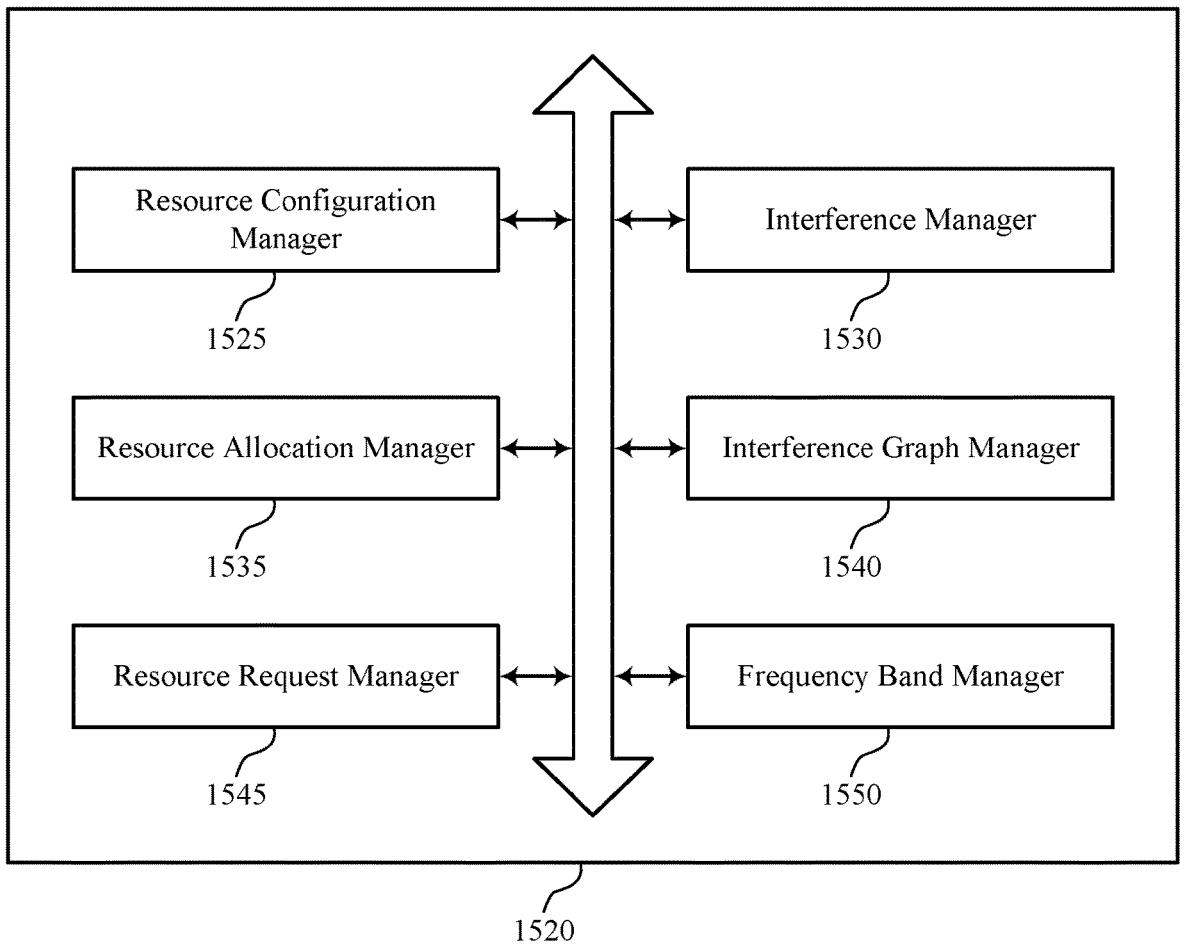
FIG. 15 shows a block diagram of a communications manager that supports RU sharing techniques in wireless communications in accordance with aspects of the present disclosure.

FIG. 15 shows a block diagram 1500 of a communications manager 1520 that supports RU sharing techniques in wireless communications in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of RU sharing techniques in wireless communications as described herein. For example, the communications manager 1520 may include a resource configuration manager 1525, an interference manager 1530, a resource allocation manager 1535, an interference graph manager 1540, a resource request manager 1545, a frequency band manager 1550, or any combination thereof. Each of these components may communicate, directly or indirectly, with one another (e.g., via one or more buses).

The communications manager 1520 may support wireless communications at a network node in accordance with examples as disclosed herein. The resource configuration manager 1525 may be configured as or otherwise support a means for transmitting, to a first RU, a request for a wireless resource configuration for a first time period. The interference manager 1530 may be configured as or otherwise support a means for transmitting, to a second RU, an interference inquiry associated with the wireless resource configuration for the first time period. In some examples, the interference manager 1530 may be configured as or otherwise support a means for receiving, from the second RU, a response to the interference inquiry. The resource allocation manager 1535 may be configured as or otherwise support a means for transmitting, based on the response to the interference inquiry, a payload to the first RU for transmission during the first time period.

In some examples, the request for the wireless resource configuration changes a time division duplexing configuration of the first time period. In some examples, the request for the wireless resource configuration is for a secondary channel associated with the network node, and where one or more DUs other than the first DU have priority for the secondary channel. In some examples, the request for the wireless resource configuration is for a primary channel to confirm compatibility between the requested wireless resource configuration and a resource configuration of one or more adjacent channels to the primary channel.

In some examples, the interference graph manager 1540 may be configured as or otherwise support a means for transmitting, to a third RU based on the response to the interference inquiry, one or more constraints on one or more attributes associated with wireless communications in at least the first time period. In some examples, the one or more attributes include one or more of a time domain duplexing configuration, a power spectral density (PSD) constraint, an effective isotropic radiated power (EIRP) constraint, a sub-band restriction, or any combinations thereof.

In some examples, the resource request manager 1545 may be configured as or otherwise support a means for transmitting, to the first RU based on the receiving the response to the interference inquiry, a first request for wireless resources in the first time period. In some examples, the resource allocation manager 1535 may be configured as or otherwise support a means for receiving, from the first RU responsive to the first request for wireless resources, a first resource allocation for the first time period based on a first priority associated with the network node and a second priority associated with a different network node.

In some examples, the first resource allocation is based at least in part the first priority being a higher priority than the second priority, and the different network node is allocated resources in the first time period based on a remaining amount of resources in the first time period outside of the first resource allocation. In some examples, the first resource allocation is associated with a first frequency band, and where a second frequency band has separate resources that are allocated independently of the first frequency band, and where different network nodes have different priorities in each of the first frequency band and the second frequency band. In some examples, the first RU allocates resources to lower priority network nodes based on higher priority network nodes reserving less than all available resources within the first time period.

Figure 16:
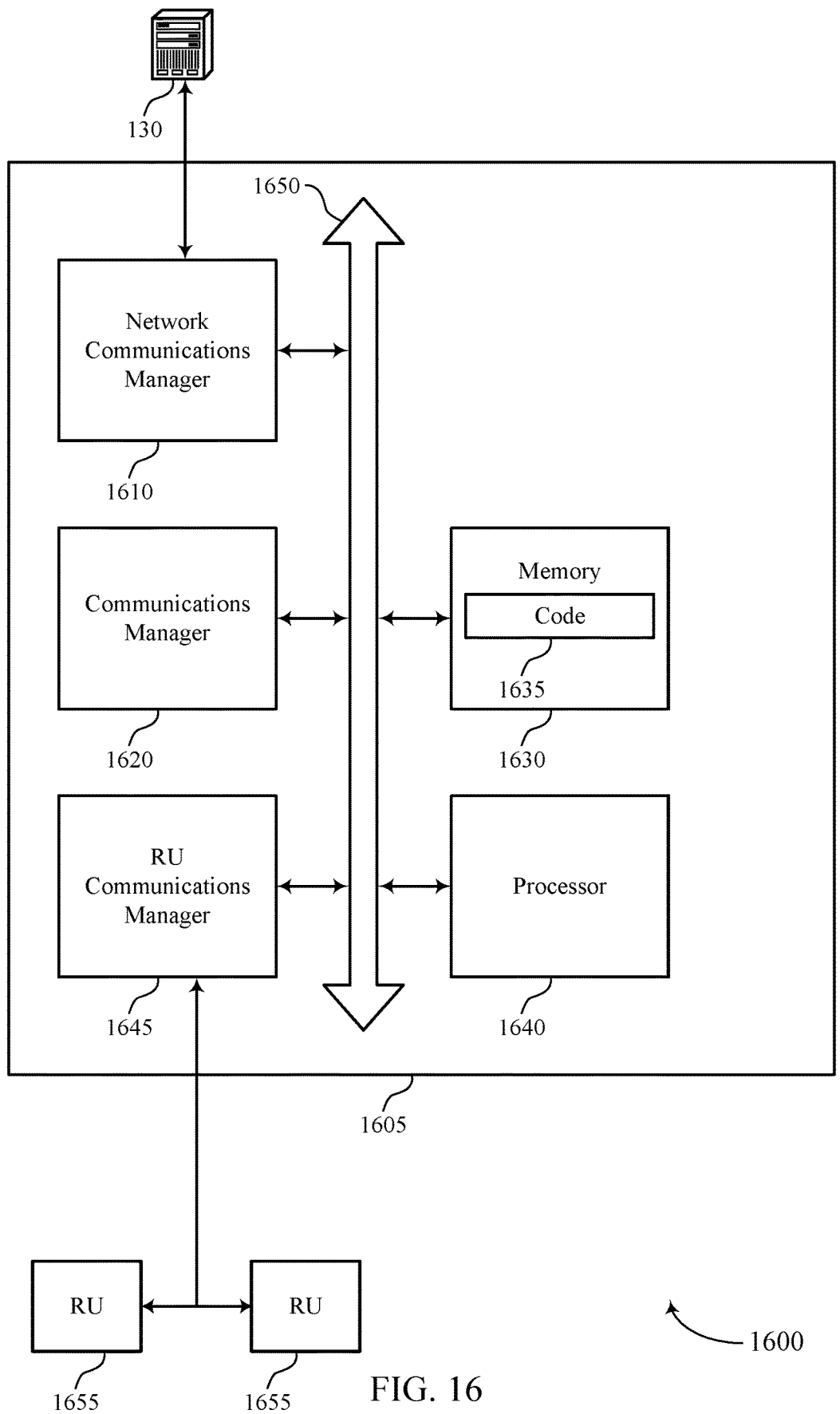
FIG. 16 shows a diagram of a system including a device that supports RU sharing techniques in wireless communications in accordance with aspects of the present disclosure.

FIG. 16 shows a diagram of a system 1600 including a device 1605 that supports RU sharing techniques in wireless communications in accordance with aspects of the present disclosure. The device 1605 may be an example of or include the components of a device 1305, a device 1405, or a DU or other network node as described herein. The device 1605 may communicate with one or more RUs 1655. The device 1605 may include components for bi-directional voice and data communications including components for transmitting and receiving communications, such as a communications manager 1620, a network communications manager 1610, a memory 1630, code 1635, a processor 1640, and a RU communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting RU sharing techniques in wireless communications). For example, the device 1605 or a component of the device 1605 may include a processor 1640 and memory 1630 coupled to the processor 1640, the processor 1640 and memory 1630 configured to perform various functions described herein.

The RU communications manager 1645 may manage communications with RUs 1655, and may include a controller or scheduler for controlling communications with UEs 115 in cooperation with RUs 1655. For example, the RU communications manager 1645 may coordinate scheduling for transmissions to UEs 115. In some examples, the RU communications manager 1645 may provide an F1 interface within a wireless communications network technology to provide communication with RUs 1655.

The communications manager 1620 may support wireless communications at a network node in accordance with examples as disclosed herein. For example, the communications manager 1620 may be configured as or otherwise support a means for transmitting, to a first RU, a request for a wireless resource configuration for a first time period. The communications manager 1620 may be configured as or otherwise support a means for transmitting, to a second RU, an interference inquiry associated with the wireless resource configuration for the first time period. The communications manager 1620 may be configured as or otherwise support a means for receiving, from the second RU, a response to the interference inquiry. The communications manager 1620 may be configured as or otherwise support a means for transmitting, based on the response to the interference inquiry, a payload to the first RU for transmission during the first time period.

By including or configuring the communications manager 1620 in accordance with examples as described herein, the device 1605 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 1620 may be configured to perform various operations (e.g., receiving, monitoring, transmitting) using or otherwise in cooperation with other components. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of RU sharing techniques in wireless communications as described herein, or the processor 1640 and the memory 1630 may be otherwise configured to perform or support such operations.

Figure 17:
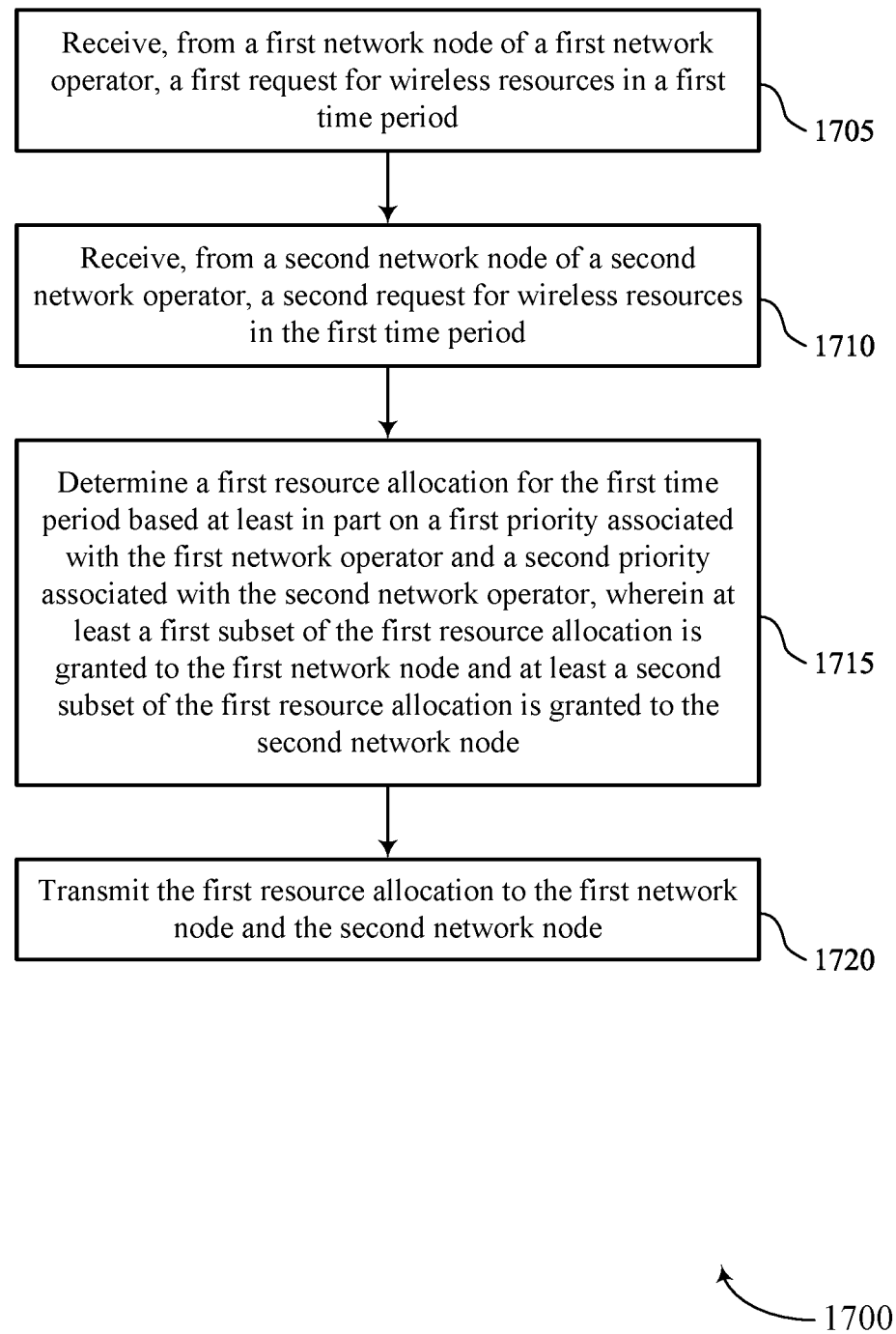
FIGS. 17 through 24 show flowcharts illustrating methods that support RU sharing techniques in wireless communications in accordance with aspects of the present disclosure.

FIG. 17 shows a flowchart illustrating a method 1700 that supports RU sharing techniques in wireless communications in accordance with aspects of the present disclosure. The operations of the method 1700 may be implemented by a RU or its components as described herein. For example, the operations of the method 1700 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 1705, the method may include receiving, from a first network node of a first network operator, a first request for wireless resources in a first time period. The operations of 1705 may be performed in accordance with examples as disclosed herein. In some examples, aspects of the operations of 1705 may be performed by a resource request manager 1125 as described with reference to FIG. 11.

At 1710, the method may include receiving, from a second network node of a second network operator, a second request for wireless resources in the first time period. The operations of 1710 may be performed in accordance with examples as disclosed herein. In some examples, aspects of the operations of 1710 may be performed by a resource request manager 1125 as described with reference to FIG. 11.

At 1715, the method may include determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The operations of 1715 may be performed in accordance with examples as disclosed herein. In some examples, aspects of the operations of 1715 may be performed by a resource allocation manager 1130 as described with reference to FIG. 11.

At 1720, the method may include transmitting the first resource allocation to the first network node and the second network node. The operations of 1720 may be performed in accordance with examples as disclosed herein. In some examples, aspects of the operations of 1720 may be performed by a resource allocation manager 1130 as described with reference to FIG. 11.

Figure 18:
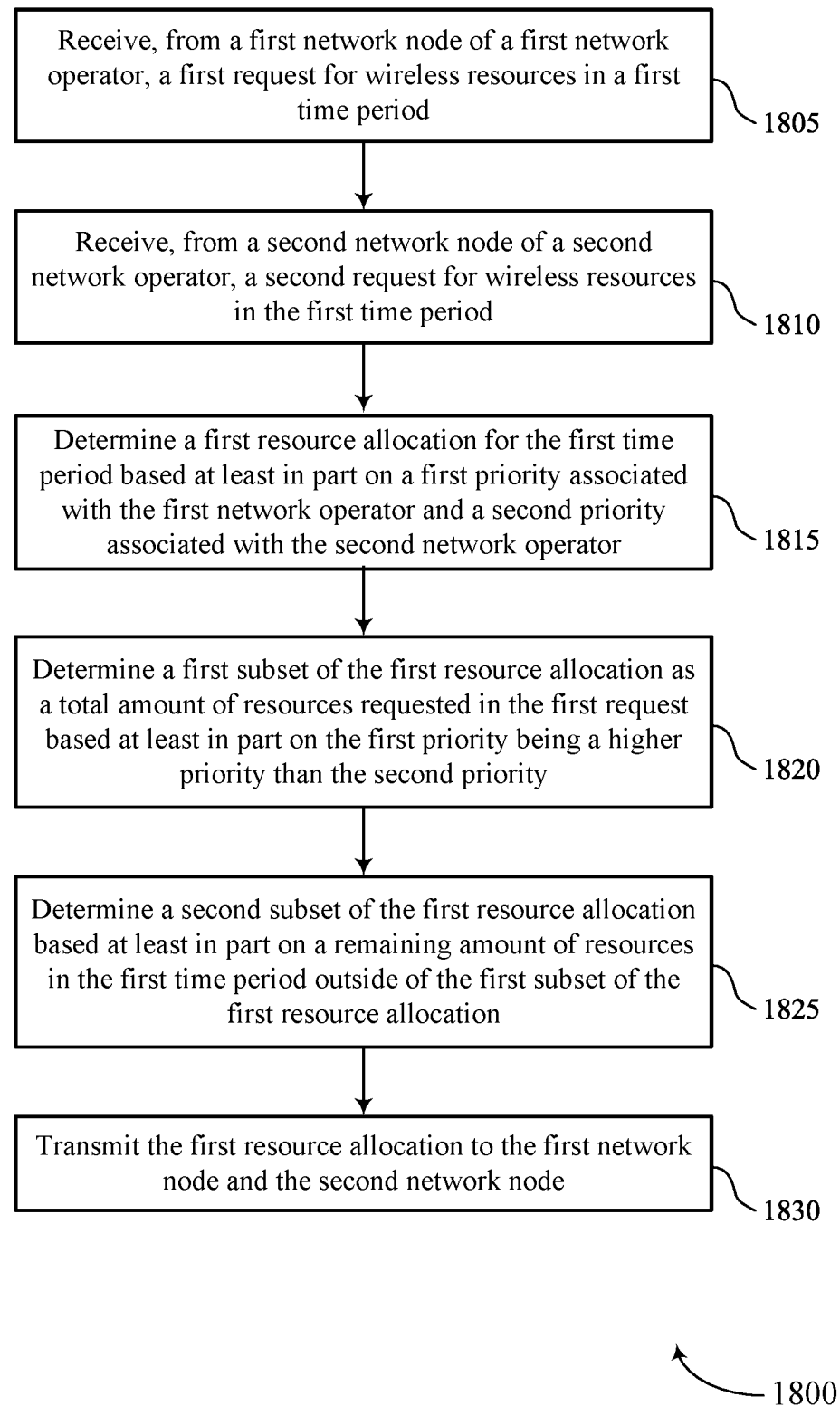

FIG. 18 shows a flowchart illustrating a method 1800 that supports RU sharing techniques in wireless communications in accordance with aspects of the present disclosure. The operations of the method 1800 may be implemented by a RU or its components as described herein. For example, the operations of the method 1800 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 1805, the method may include receiving, from a first network node of a first network operator, a first request for wireless resources in a first time period. The operations of 1805 may be performed in accordance with examples as disclosed herein. In some examples, aspects of the operations of 1805 may be performed by a resource request manager 1125 as described with reference to FIG. 11.

At 1810, the method may include receiving, from a second network node of a second network operator, a second request for wireless resources in the first time period. The operations of 1810 may be performed in accordance with examples as disclosed herein. In some examples, aspects of the operations of 1810 may be performed by a resource request manager 1125 as described with reference to FIG. 11.

At 1815, the method may include determining a first resource allocation for the first time period based on a first priority associated with the first network operator and a second priority associated with the second network operator. The operations of 1815 may be performed in accordance with examples as disclosed herein. In some examples, aspects of the operations of 1815 may be performed by a resource allocation manager 1130 as described with reference to FIG. 11.

At 1820, the method may include determining a first subset of the first resource allocation as a total amount of resources requested in the first request based on the first priority being a higher priority than the second priority. The operations of 1820 may be performed in accordance with examples as disclosed herein. In some examples, aspects of the operations of 1820 may be performed by a prioritization manager 1135 as described with reference to FIG. 11.

At 1825, the method may include determining a second subset of the first resource allocation based on a remaining amount of resources in the first time period outside of the first subset of the first resource allocation. The operations of 1825 may be performed in accordance with examples as disclosed herein. In some examples, aspects of the operations of 1825 may be performed by a prioritization manager 1135 as described with reference to FIG. 11.

At 1830, the method may include transmitting the first resource allocation to the first network node and the second network node. The operations of 1830 may be performed in accordance with examples as disclosed herein. In some examples, aspects of the operations of 1830 may be performed by a resource allocation manager 1130 as described with reference to FIG. 11.

Figure 19:
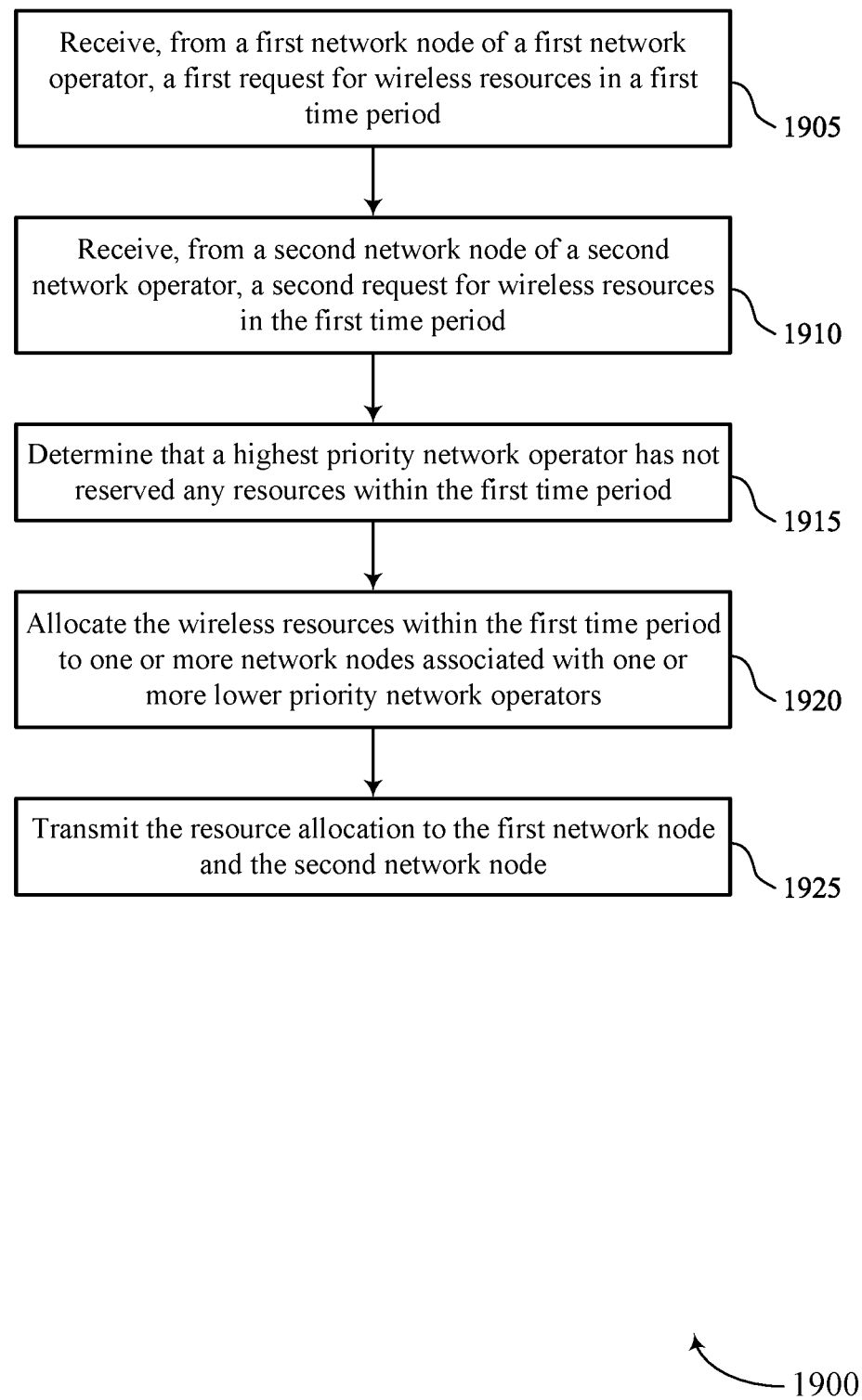

FIG. 19 shows a flowchart illustrating a method 1900 that supports RU sharing techniques in wireless communications in accordance with aspects of the present disclosure. The operations of the method 1900 may be implemented by a RU or its components as described herein. For example, the operations of the method 1900 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 1905, the method may include receiving, from a first network node of a first network operator, a first request for wireless resources in a first time period. The operations of 1905 may be performed in accordance with examples as disclosed herein. In some examples, aspects of the operations of 1905 may be performed by a resource request manager 1125 as described with reference to FIG. 11.

At 1910, the method may include receiving, from a second network node of a second network operator, a second request for wireless resources in the first time period. The operations of 1910 may be performed in accordance with examples as disclosed herein. In some examples, aspects of the operations of 1910 may be performed by a resource request manager 1125 as described with reference to FIG. 11.

At 1915, the method may include determining that a highest priority network operator has not reserved any resources within the first time period. The operations of 1915 may be performed in accordance with examples as disclosed herein. In some examples, aspects of the operations of 1915 may be performed by a prioritization manager 1135 as described with reference to FIG. 11.

At 1920, the method may include allocating the wireless resources within the first time period to one or more network nodes associated with one or more lower priority network operators. The operations of 1920 may be performed in accordance with examples as disclosed herein. In some examples, aspects of the operations of 1920 may be performed by a prioritization manager 1135 as described with reference to FIG. 11.

At 1925, the method may include transmitting the resource allocation to the first network node and the second network node. The operations of 1925 may be performed in accordance with examples as disclosed herein. In some examples, aspects of the operations of 1925 may be performed by a resource allocation manager 1130 as described with reference to FIG. 11.

Figure 20:
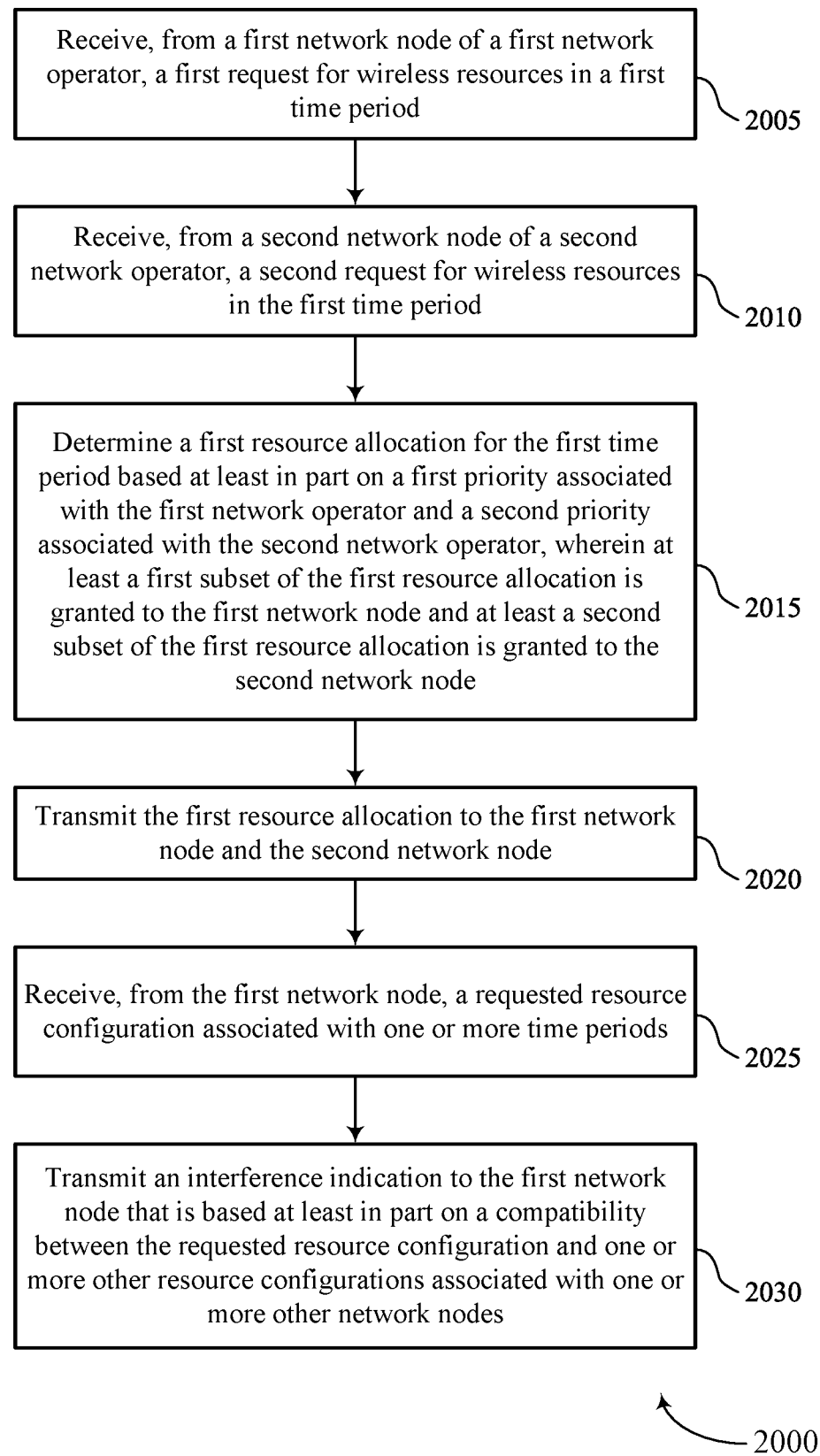

FIG. 20 shows a flowchart illustrating a method 2000 that supports RU sharing techniques in wireless communications in accordance with aspects of the present disclosure. The operations of the method 2000 may be implemented by a RU or its components as described herein. For example, the operations of the method 2000 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 2005, the method may include receiving, from a first network node of a first network operator, a first request for wireless resources in a first time period. The operations of 2005 may be performed in accordance with examples as disclosed herein. In some examples, aspects of the operations of 2005 may be performed by a resource request manager 1125 as described with reference to FIG. 11.

At 2010, the method may include receiving, from a second network node of a second network operator, a second request for wireless resources in the first time period. The operations of 2010 may be performed in accordance with examples as disclosed herein. In some examples, aspects of the operations of 2010 may be performed by a resource request manager 1125 as described with reference to FIG. 11.

At 2015, the method may include determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The operations of 2015 may be performed in accordance with examples as disclosed herein. In some examples, aspects of the operations of 2015 may be performed by a resource allocation manager 1130 as described with reference to FIG. 11.

At 2020, the method may include transmitting the first resource allocation to the first network node and the second network node. The operations of 2020 may be performed in accordance with examples as disclosed herein. In some examples, aspects of the operations of 2020 may be performed by a resource allocation manager 1130 as described with reference to FIG. 11.

At 2025, the method may include receiving, from the first network node, a requested resource configuration associated with one or more time periods. The operations of 2025 may be performed in accordance with examples as disclosed herein. In some examples, aspects of the operations of 2025 may be performed by an interference manager 1145 as described with reference to FIG. 11.

At 2030, the method may include transmitting an interference indication to the first network node that is based on a compatibility between the requested resource configuration and one or more other resource configurations associated with one or more other network nodes. The operations of 2030 may be performed in accordance with examples as disclosed herein. In some examples, aspects of the operations of 2030 may be performed by an interference manager 1145 as described with reference to FIG. 11.

Figure 21:
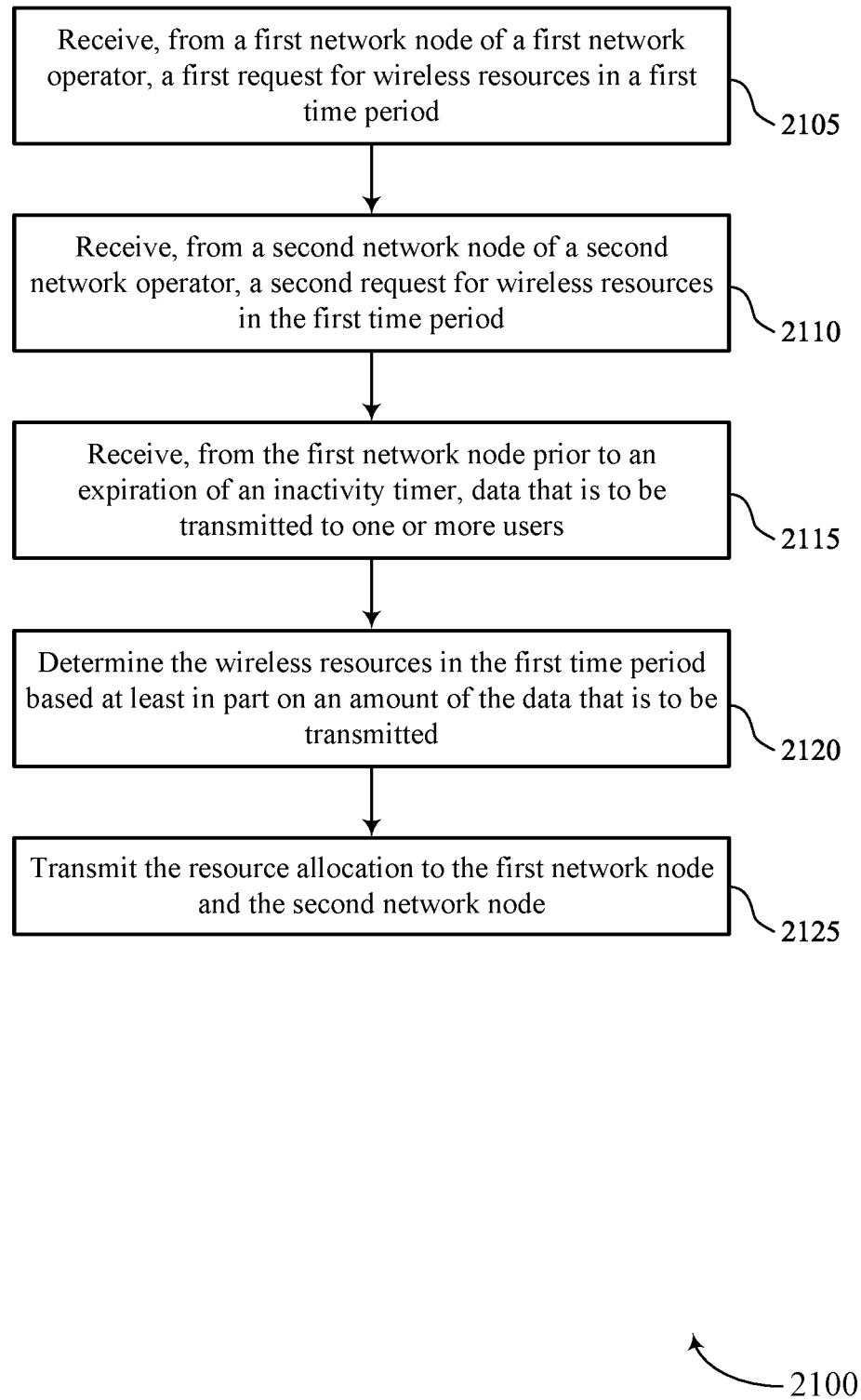

FIG. 21 shows a flowchart illustrating a method 2100 that supports RU sharing techniques in wireless communications in accordance with aspects of the present disclosure. The operations of the method 2100 may be implemented by a RU or its components as described herein. For example, the operations of the method 2100 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 2105, the method may include receiving, from a first network node of a first network operator, a first request for wireless resources in a first time period. The operations of 2105 may be performed in accordance with examples as disclosed herein. In some examples, aspects of the operations of 2105 may be performed by a resource request manager 1125 as described with reference to FIG. 11.

At 2110, the method may include receiving, from a second network node of a second network operator, a second request for wireless resources in the first time period. The operations of 2110 may be performed in accordance with examples as disclosed herein. In some examples, aspects of the operations of 2110 may be performed by a resource request manager 1125 as described with reference to FIG. 11.

At 2115, the method may include receiving, from the first network node prior to an expiration of an inactivity timer, data that is to be transmitted to one or more users. The operations of 2115 may be performed in accordance with examples as disclosed herein. In some examples, aspects of the operations of 2115 may be performed by a resource request manager 1125 as described with reference to FIG. 11.

At 2120, the method may include determining the wireless resources in the first time period based on an amount of the data that is to be transmitted. The operations of 2120 may be performed in accordance with examples as disclosed herein. In some examples, aspects of the operations of 2120 may be performed by a resource allocation manager 1130 as described with reference to FIG. 11.

At 2125, the method may include transmitting the resource allocation to the first network node and the second network node. The operations of 2125 may be performed in accordance with examples as disclosed herein. In some examples, aspects of the operations of 2125 may be performed by a resource allocation manager 1130 as described with reference to FIG. 11.

Figure 22:
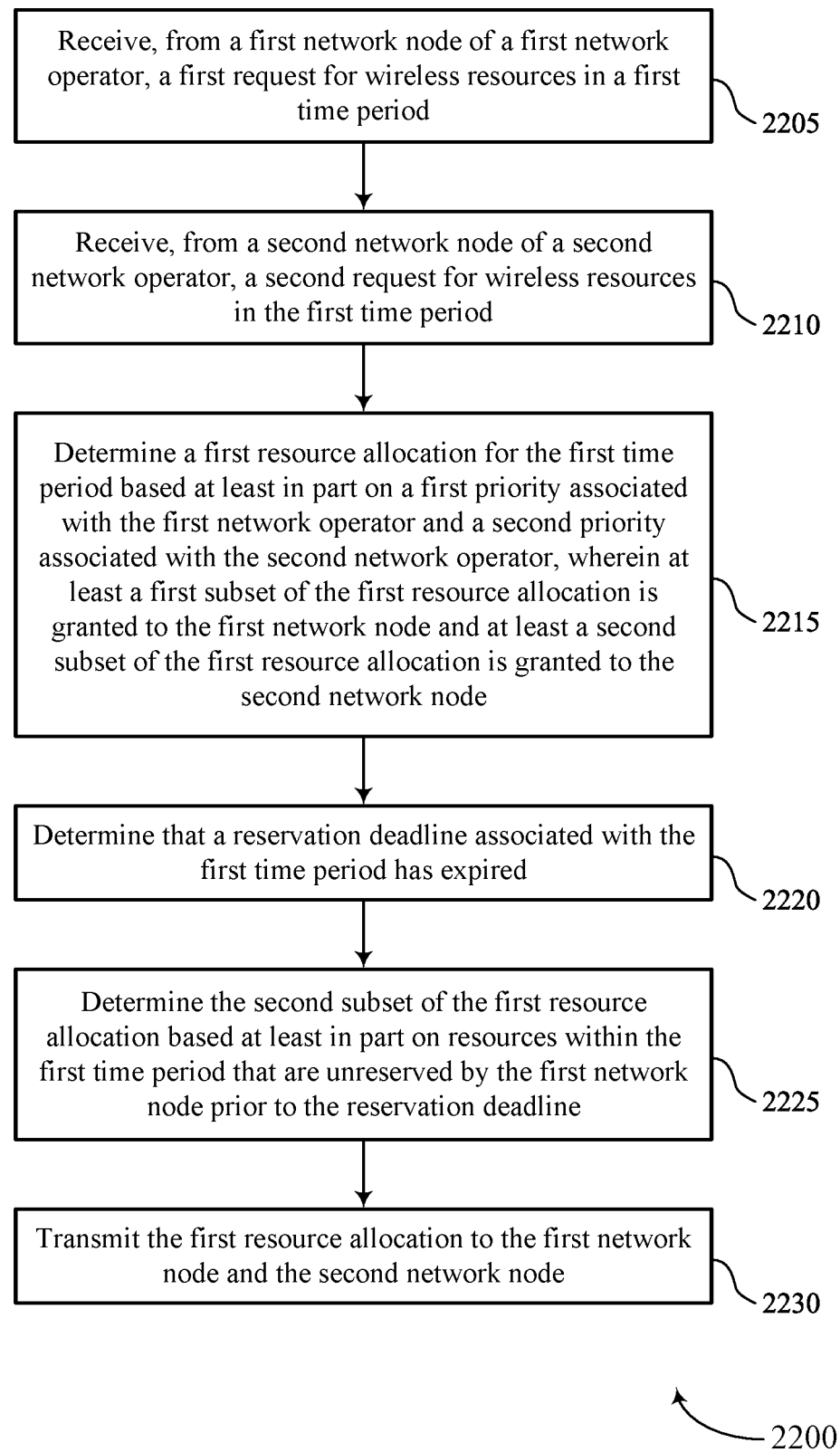

FIG. 22 shows a flowchart illustrating a method 2200 that supports RU sharing techniques in wireless communications in accordance with aspects of the present disclosure. The operations of the method 2200 may be implemented by a RU or its components as described herein. For example, the operations of the method 2200 may be performed by a RU as described with reference to FIGS. 1 through 12. In some examples, a RU may execute a set of instructions to control the functional elements of the RU to perform the described functions. Additionally or alternatively, the RU may perform aspects of the described functions using special-purpose hardware.

At 2205, the method may include receiving, from a first network node of a first network operator, a first request for wireless resources in a first time period. The operations of 2205 may be performed in accordance with examples as disclosed herein. In some examples, aspects of the operations of 2205 may be performed by a resource request manager 1125 as described with reference to FIG. 11.

At 2210, the method may include receiving, from a second network node of a second network operator, a second request for wireless resources in the first time period. The operations of 2210 may be performed in accordance with examples as disclosed herein. In some examples, aspects of the operations of 2210 may be performed by a resource request manager 1125 as described with reference to FIG. 11.

At 2215, the method may include determining a first resource allocation for the first time period based on a first priority associated with the first network operator and a second priority associated with the second network operator, where at least a first subset of the first resource allocation is granted to the first network node and at least a second subset of the first resource allocation is granted to the second network node. The operations of 2215 may be performed in accordance with examples as disclosed herein. In some examples, aspects of the operations of 2215 may be performed by a resource allocation manager 1130 as described with reference to FIG. 11.

At 2220, the method may include determining that a reservation deadline associated with the first time period has expired. The operations of 2220 may be performed in accordance with examples as disclosed herein. In some examples, aspects of the operations of 2220 may be performed by a resource allocation manager 1130 as described with reference to FIG. 11.

At 2225, the method may include determining the second subset of the first resource allocation based on resources within the first time period that are unreserved by the first network node prior to the reservation deadline. The operations of 2225 may be performed in accordance with examples as disclosed herein. In some examples, aspects of the operations of 2225 may be performed by a resource allocation manager 1130 as described with reference to FIG. 11.

At 2230, the method may include transmitting the first resource allocation to the first network node and the second network node. The operations of 2230 may be performed in accordance with examples as disclosed herein. In some examples, aspects of the operations of 2230 may be performed by a resource allocation manager 1130 as described with reference to FIG. 11.

Figure 23:
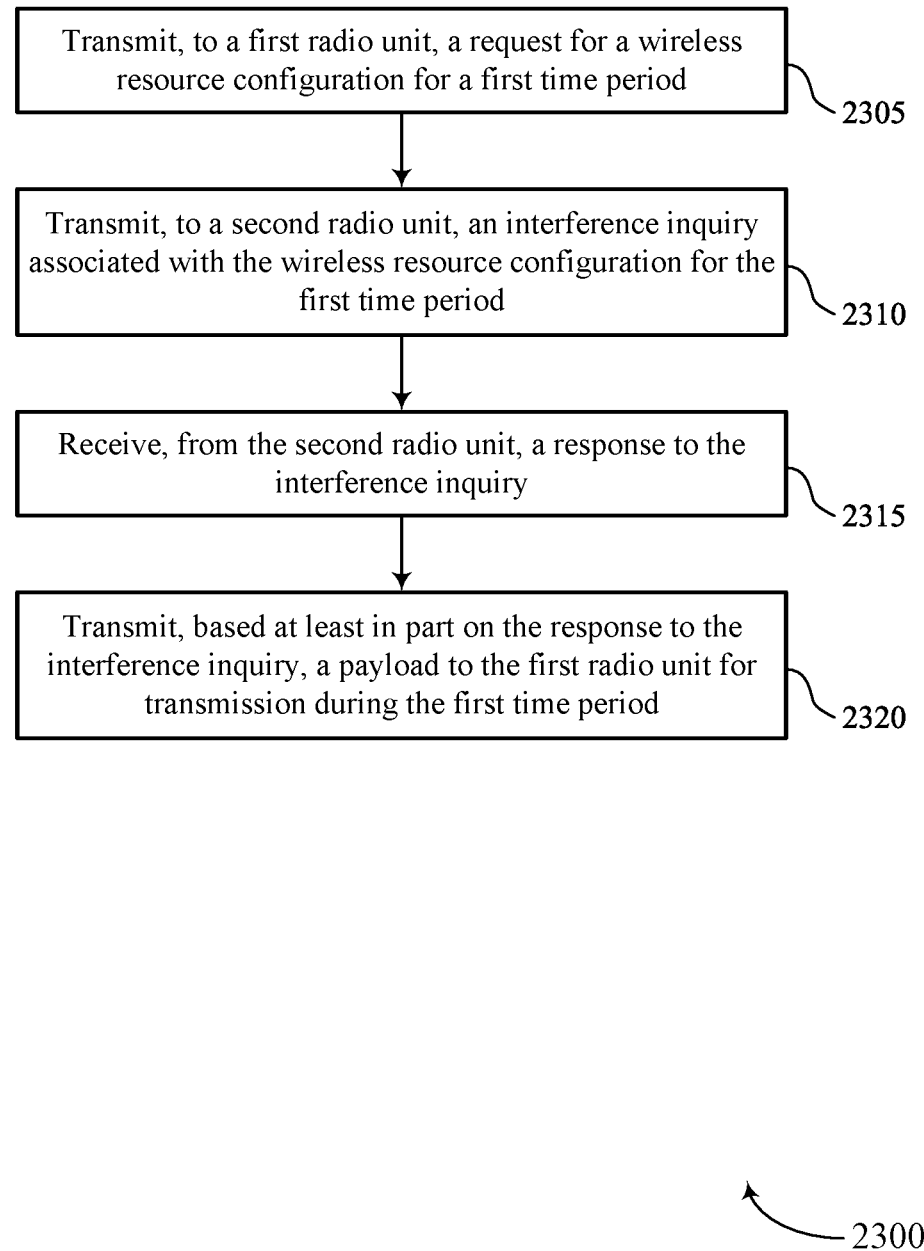

FIG. 23 shows a flowchart illustrating a method 2300 that supports RU sharing techniques in wireless communications in accordance with aspects of the present disclosure. The operations of the method 2300 may be implemented by a DU or its components as described herein. For example, the operations of the method 2300 may be performed by a DU as described with reference to FIGS. 1 through 8 and 13 through 16. In some examples, a DU may execute a set of instructions to control the functional elements of the DU to perform the described functions. Additionally or alternatively, the DU may perform aspects of the described functions using special-purpose hardware.

At 2305, the method may include transmitting, to a first RU, a request for a wireless resource configuration for a first time period. The operations of 2305 may be performed in accordance with examples as disclosed herein. In some examples, aspects of the operations of 2305 may be performed by a resource configuration manager 1525 as described with reference to FIG. 15.

At 2310, the method may include transmitting, to a second RU, an interference inquiry associated with the wireless resource configuration for the first time period. The operations of 2310 may be performed in accordance with examples as disclosed herein. In some examples, aspects of the operations of 2310 may be performed by an interference manager 1530 as described with reference to FIG. 15.

At 2315, the method may include receiving, from the second RU, a response to the interference inquiry. The operations of 2315 may be performed in accordance with examples as disclosed herein. In some examples, aspects of the operations of 2315 may be performed by an interference manager 1530 as described with reference to FIG. 15.

At 2320, the method may include transmitting, based on the response to the interference inquiry, a payload to the first RU for transmission during the first time period. The operations of 2320 may be performed in accordance with examples as disclosed herein. In some examples, aspects of the operations of 2320 may be performed by a resource allocation manager 1535 as described with reference to FIG. 15.

Figure 24:
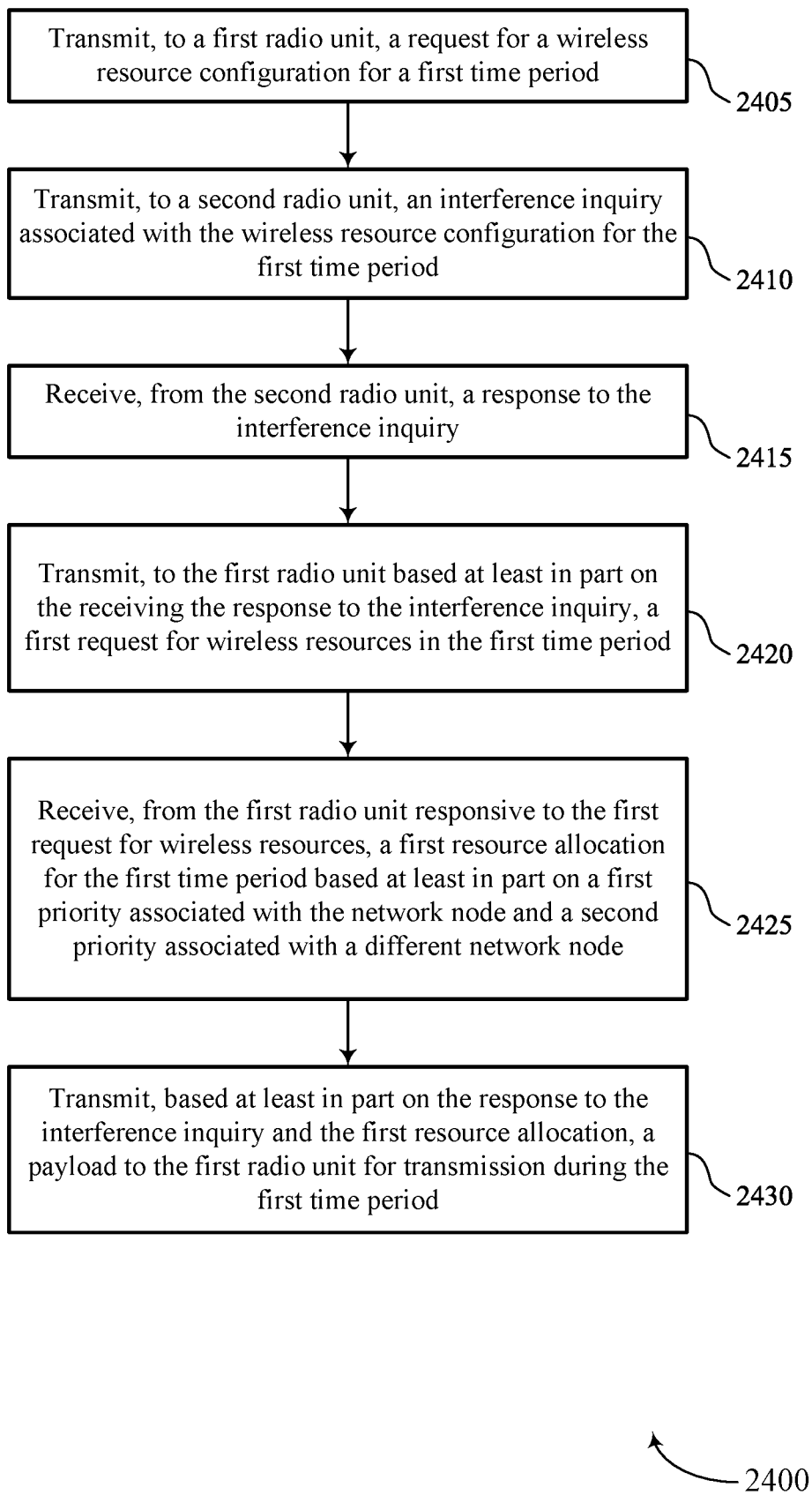

FIG. 24 shows a flowchart illustrating a method 2400 that supports RU sharing techniques in wireless communications in accordance with aspects of the present disclosure. The operations of the method 2400 may be implemented by a DU or its components as described herein. For example, the operations of the method 2400 may be performed by a DU as described with reference to FIGS. 1 through 8 and 13 through 16. In some examples, a DU may execute a set of instructions to control the functional elements of the DU to perform the described functions. Additionally or alternatively, the DU may perform aspects of the described functions using special-purpose hardware.

At 2405, the method may include transmitting, to a first RU, a request for a wireless resource configuration for a first time period. The operations of 2405 may be performed in accordance with examples as disclosed herein. In some examples, aspects of the operations of 2405 may be performed by a resource configuration manager 1525 as described with reference to FIG. 15.

At 2410, the method may include transmitting, to a second RU, an interference inquiry associated with the wireless resource configuration for the first time period. The operations of 2410 may be performed in accordance with examples as disclosed herein. In some examples, aspects of the operations of 2410 may be performed by an interference manager 1530 as described with reference to FIG. 15.

At 2415, the method may include receiving, from the second RU, a response to the interference inquiry. The operations of 2415 may be performed in accordance with examples as disclosed herein. In some examples, aspects of the operations of 2415 may be performed by an interference manager 1530 as described with reference to FIG. 15.

At 2420, the method may include transmitting, to the first RU based on the receiving the response to the interference inquiry, a first request for wireless resources in the first time period. The operations of 2420 may be performed in accordance with examples as disclosed herein. In some examples, aspects of the operations of 2420 may be performed by a resource request manager 1545 as described with reference to FIG. 15.

At 2425, the method may include receiving, from the first RU responsive to the first request for wireless resources, a first resource allocation for the first time period based on a first priority associated with the network node and a second priority associated with a different network node. The operations of 2425 may be performed in accordance with examples as disclosed herein. In some examples, aspects of the operations of 2425 may be performed by a resource allocation manager 1535 as described with reference to FIG. 15.

At 2430, the method may include transmitting, based on the response to the interference inquiry and the first resource allocation, a payload to the first RU for transmission during the first time period. The operations of 2430 may be performed in accordance with examples as disclosed herein. In some examples, aspects of the operations of 2430 may be performed by a resource allocation manager 1535 as described with reference to FIG. 15.

The following provides an overview of aspects of the present disclosure:

Aspect 1: A method for wireless communications at a radio unit, comprising: receiving, from a first network node of a first network operator, a first request for wireless resources in a first time period; receiving, from a second network node of a second network operator, a second request for wireless resources in the first time period; determining a first resource allocation for the first time period based at least in part on a first priority associated with the first network operator and a second priority associated with the second network operator, wherein at least a first subset of the first resource allocation is granted to the first network node and at least a second subset of the first resource allocation is granted to the second network node; and transmitting the first resource allocation to the first network node and the second network node.

Aspect 2: The method of aspect 1, wherein the determining comprises: determining the first subset of the first resource allocation as a total amount of resources requested in the first request based at least in part on the first priority being a higher priority than the second priority; and determining the second subset of the first resource allocation based at least in part on a remaining amount of resources in the first time period outside of the first subset of the first resource allocation.

Aspect 3: The method of any of aspects 1 through 2, wherein the first resource allocation is associated with a first frequency band, and wherein a second frequency band has separate resources that are allocated independently of the first frequency band, and wherein the first network operator has a different priority relative to the second network operator in each of the first frequency band and the second frequency band.

Aspect 4: The method of any of aspects 1 through 3, wherein the determining comprises: determining that a highest priority network operator has not reserved any resources within the first time period; and allocating the wireless resources within the first time period to one or more network nodes associated with one or more lower priority network operators.

Aspect 5: The method of any of aspects 1 through 4, further comprising: receiving, from the first network node, a requested resource configuration associated with one or more time periods; and transmitting an interference indication to the first network node that is based at least in part on a compatibility between the requested resource configuration and one or more other resource configurations associated with one or more other network nodes.

Aspect 6: The method of aspect 5, wherein the requested resource configuration changes a time division duplexing configuration of the one or more time periods.

Aspect 7: The method of any of aspects 5 through 6, wherein the requested resource configuration is for a secondary channel associated with the first network node, and wherein one or more other radio units have priority for the secondary channel.

Aspect 8: The method of any of aspects 5 through 7, wherein the requested resource configuration is for a primary channel to confirm compatibility between the requested resource configuration and a resource configuration of one or more adjacent channels to the primary channel.

Aspect 9: The method of any of aspects 1 through 8, wherein the receiving the first request comprises: receiving, from the first network node prior to an expiration of an inactivity timer, data that is to be transmitted to one or more users; and determining the wireless resources in the first time period based at least in part on an amount of the data that is to be transmitted.

Aspect 10: The method of any of aspects 1 through 8, wherein the receiving the first request comprises: receiving, from the first network node after an expiration of an inactivity timer, an explicit request for the wireless resources in the first time period.

Aspect 11: The method of any of aspects 1 through 8, wherein the determining comprises: determining that a reservation deadline associated with the first time period has expired; and determining the second subset of the first resource allocation based at least in part on resources within the first time period that are unreserved by the first network node prior to the reservation deadline.

Aspect 12: A method for wireless communications at a network node, comprising: transmitting, to a first radio unit, a request for a wireless resource configuration for a first time period; transmitting, to a second radio unit, an interference inquiry associated with the wireless resource configuration for the first time period; receiving, from the second radio unit, a response to the interference inquiry; and transmitting, based at least in part on the response to the interference inquiry, a payload to the first radio unit for transmission during the first time period.

Aspect 13: The method of aspect 12, wherein the request for the wireless resource configuration changes a time division duplexing configuration of the first time period.

Aspect 14: The method of aspect 13, wherein the request for the wireless resource configuration is for a secondary channel associated with the network node, and wherein one or more different network nodes have priority for the secondary channel.

Aspect 15: The method of aspect 13, wherein the request for the wireless resource configuration is for a primary channel to confirm compatibility between the requested wireless resource configuration and a resource configuration of one or more adjacent channels to the primary channel.

Aspect 16: The method of any of aspects 12 through 15, further comprising: transmitting, to a third radio unit based at least in part on the response to the interference inquiry, one or more constraints on one or more attributes associated with wireless communications in at least the first time period.

Aspect 17: The method of aspect 16, wherein the one or more attributes include one or more of a time domain duplexing configuration, a power spectral density (PSD) constraint, an effective isotropic radiated power (EIRP) constraint, a sub-band restriction, or any combinations thereof.

Aspect 18: The method of any of aspects 12 through 17, further comprising: transmitting, to the first radio unit based at least in part on the receiving the response to the interference inquiry, a first request for wireless resources in the first time period; and receiving, from the first radio unit responsive to the first request for wireless resources, a first resource allocation for the first time period based at least in part on a first priority associated with the network node and a second priority associated with a different network node.

Aspect 19: The method of aspect 18, wherein the first resource allocation is based at least in part the first priority being a higher priority than the second priority, and the different network node is allocated resources in the first time period based at least in part on a remaining amount of resources in the first time period outside of the first resource allocation.

Aspect 20: The method of any of aspects 18 through 19, wherein the first resource allocation is associated with a first frequency band, and wherein a second frequency band has separate resources that are allocated independently of the first frequency band, and wherein different network nodes have different priorities in each of the first frequency band and the second frequency band.

Aspect 21: The method of any of aspects 18 through 20, wherein the first radio unit allocates resources to lower priority network nodes based at least in part on higher priority network nodes reserving less than all available resources within the first time period.

Aspect 22: An apparatus for wireless communications at a radio unit, comprising a processor; memory coupled with the processor; and instructions stored in the memory and executable by the processor to cause the apparatus to perform a method of any of aspects 1 through 11.

Aspect 23: An apparatus for wireless communications at a radio unit, comprising at least one means for performing a method of any of aspects 1 through 11.

Aspect 24: A non-transitory computer-readable medium storing code for wireless communications at a radio unit, the code comprising instructions executable by a processor to perform a method of any of aspects 1 through 11.

Aspect 25: An apparatus for wireless communications at a network node, comprising a processor; memory coupled with the processor; and instructions stored in the memory and executable by the processor to cause the apparatus to perform a method of any of aspects 12 through 21.

Aspect 26: An apparatus for wireless communications at a network node, comprising at least one means for performing a method of any of aspects 12 through 21.

Aspect 27: A non-transitory computer-readable medium storing code for wireless communications at a network node, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network node, comprising:
   receiving reference signals from each of a plurality of radio units;
   determining respective reference signal received power (RSRP) measurements of each of the plurality of radio units from the received reference signals;
   determining a subset of radio units from the plurality of radio units having a determined RSRP measurement exceeding a threshold value, the subset of radio units comprising a first radio unit;
   transmitting, to the first radio unit, a request for a wireless resource configuration for a first time period;
   transmitting, to each radio unit of the subset of radio units apart from the first radio unit, an interference inquiry regarding interference conditions associated with the wireless resource configuration for the first time period;
   receiving, from each radio unit of the subset of radio units, indications for permission for the network node to utilize resources associated with the wireless resource configuration, the indications contingent upon the interference inquiry indicating that interference conditions associated with the wireless resource configuration for each radio unit of the subset of radio units apart from the first radio unit do not exceed an interference threshold; and
   transmitting, based at least in part on the indications, a payload to the first radio unit for transmission during the first time period.

2. The method of claim 1, wherein the request for the wireless resource configuration changes a time division duplexing configuration of the first time period.

3. The method of claim 2, wherein the request for the wireless resource configuration is for a secondary channel associated with the network node, and wherein one or more different network nodes have priority for the secondary channel.

4. The method of claim 2, wherein the request for the wireless resource configuration is for a primary channel to confirm compatibility between the requested wireless resource configuration and a resource configuration of one or more adjacent channels to the primary channel.

5. The method of claim 1, further comprising:
transmitting, to a second radio unit based at least in part on a response to the interference inquiry, one or more constraints on one or more attributes associated with wireless communications in at least the first time period.

6. The method of claim 5, wherein the one or more attributes include one or more of a time domain duplexing configuration, a power spectral density (PSD) constraint, an effective isotropic radiated power (EIRP) constraint, a sub-band restriction, or any combinations thereof.

7. The method of claim 1, further comprising:
transmitting, to the first radio unit based at least in part on receiving a response to the interference inquiry, a first request for wireless resources in the first time period; and
receiving, from the first radio unit responsive to the first request for wireless resources, a first resource allocation for the first time period based at least in part on a first priority associated with the network node and a second priority associated with a different network node.

8. The method of claim 7, wherein the first resource allocation is based at least in part on the first priority being a higher priority than the second priority, and the different network node is allocated resources in the first time period based at least in part on a remaining amount of resources in the first time period outside of the first resource allocation.

9. The method of claim 7, wherein the first resource allocation is associated with a first frequency band, and wherein a second frequency band has separate resources that are allocated independently of the first frequency band, and wherein different network nodes have different priorities in each of the first frequency band and the second frequency band.

10. The method of claim 7, wherein the first radio unit allocates resources to lower priority network nodes based at least in part on higher priority network nodes reserving less than all available resources within the first time period.

11. An apparatus for wireless communications at a network node, comprising:
one or more processors;
memory coupled with the one or more processors; and
instructions stored in the memory and executable by the one or more processors to cause the apparatus to:
receive reference signals from each of a plurality of radio units;
determine respective reference signal received power (RSRP) measurements of each of the plurality of radio units from the received reference signals;
determine a subset of radio units from the plurality of radio units having a determined RSRP measurement exceeding a threshold value, the subset of radio units comprising a first radio unit;
transmit, to the first radio unit, a request for a wireless resource configuration for a first time period;
transmit, to each radio unit of the subset of radio units apart from the first radio unit, an interference inquiry regarding interference conditions associated with the wireless resource configuration for the first time period;
receive, from each radio unit of the subset of radio units, indications for permission for the network node to utilize resources associated with the wireless resource configuration, the indications contingent upon the interference inquiry indicating that interference conditions associated with the wireless resource configuration for each radio unit of the subset of radio units apart from the first radio unit do not exceed an interference threshold; and
transmit, based at least in part on the indications, a payload to the first radio unit for transmission during the first time period.

12. The apparatus of claim 11, wherein the request for the wireless resource configuration changes a time division duplexing configuration of the first time period.

13. The apparatus of claim 12, wherein the request for the wireless resource configuration is for a secondary channel associated with the network node, and wherein one or more other network nodes have priority for the secondary channel.

14. The apparatus of claim 12, wherein the request for the wireless resource configuration is for a primary channel to confirm compatibility between the requested wireless resource configuration and a resource configuration of one or more adjacent channels to the primary channel.

15. The apparatus of claim 11, wherein the instructions are further executable by the one or more processors to cause the apparatus to:
transmit, to a second radio unit based at least in part on a response to the interference inquiry, one or more constraints on one or more attributes associated with wireless communications in at least the first time period.

* * * * *